US009444565B1

(12) United States Patent
Leopardi et al.

(10) Patent No.: US 9,444,565 B1
(45) Date of Patent: Sep. 13, 2016

(54) WIRELESS AUDIO COMMUNICATIONS DEVICE, SYSTEM AND METHOD

(71) Applicant: NINJAWAV, LLC, Fort Lauderdale, FL (US)

(72) Inventors: Emmett Jay Leopardi, Wilton Manors, FL (US); Walter Riley Thurmond, III, Maple Valley, WA (US); Carl R. Harte, Tamarac, FL (US)

(73) Assignee: NINJAWAV, LLC, Hellertown, PA (US)

( * ) Notice: Subject to any disclaimer, the term of this patent is extended or adjusted under 35 U.S.C. 154(b) by 0 days.

(21) Appl. No.: 14/874,900

(22) Filed: Oct. 5, 2015

Related U.S. Application Data

(63) Continuation-in-part of application No. 14/746,943, filed on Jun. 23, 2015, now Pat. No. 9,219,807, which is a continuation-in-part of application No. 29/525,606, filed on Apr. 30, 2015.

(51) Int. Cl.
| | |
|---|---|
| *H04B 3/36* | (2006.01) |
| *H04H 20/86* | (2008.01) |
| *H04H 60/91* | (2008.01) |
| *H04R 3/12* | (2006.01) |
| *H04L 29/06* | (2006.01) |

(52) U.S. Cl.
CPC .............. *H04H 20/86* (2013.01); *H04H 60/91* (2013.01); *H04L 65/4076* (2013.01); *H04R 3/12* (2013.01); *H04R 2420/07* (2013.01)

(58) Field of Classification Search
CPC .. H04H 60/27; H04H 2201/19; H04H 20/38; H04H 60/46

USPC .............. 455/7, 11.1, 14, 15, 23, 3.01, 3.02, 455/3.06, 422.1, 403, 73, 575.1, 557, 559, 455/556.1, 550.1, 575.7, 90.1–90.3, 571, 455/414.1–414.4, 466, 445; 709/204, 203, 709/206, 231, 226, 219, 223; 381/334, 387; 370/315, 310, 324, 328, 329, 279; 375/211, 213
See application file for complete search history.

(56) References Cited

U.S. PATENT DOCUMENTS

| | | | |
|---|---|---|---|
| 7,742,740 B2 | 6/2010 | Goldberg et al. | |
| 8,521,316 B2 | 8/2013 | Louboutin | |
| 2015/0100143 A1 | 4/2015 | Gao et al. | |
| 2015/0341406 A1* | 11/2015 | Rockefeller | .......... H04L 65/403 709/219 |

* cited by examiner

*Primary Examiner* — Keith Ferguson
(74) *Attorney, Agent, or Firm* — The Concept Law Group, P.A.; Scott D. Smiley; Yongae Jun

(57) ABSTRACT

A method for dynamic media distribution is disclosed. An audio content server receives, from a computing device of a first user, a request to follow a second user; and designates the first user as a follower of the second user. The audio content server receives from a computing device of a third user, a request to follow the first user; and designates the third user as a follower of the first user. When the audio content server receives from a computing device of the second user, a request to stream a first audio content, the audio content server synchronously streams the first audio content to the second user and the plurality of followers of the second user, first user and the third user among the plurality of followers.

20 Claims, 16 Drawing Sheets

WIRELESS AUDIO COMMUNICATIONS DEVICE, SYSTEM AND METHOD

CROSS-REFERENCE TO RELATED APPLICATION

This application is a continuation-in-part of U.S. application Ser. No. 14/746,943, filed Jun. 23, 2015, which is a continuation-in-part of U.S. application Ser. No. 29/525,606, filed Apr. 30, 2015, the entireties of which are incorporated herein by reference.

FIELD OF THE INVENTION

The present invention relates generally to wireless audio communications, and more particularly relates to a device, system, and method for synchronously sharing music content from an audio output device to a plurality of audio receiver devices over a wireless network.

BACKGROUND OF THE INVENTION

People desire the ability to simultaneously listen to music. Unfortunately, existing technologies for doing so are limited. For example, one common method for multiple individuals at remote locations to simultaneously listen to music is to tune-in to the same radio broadcast station that broadcasts music on predetermined FM/AM/satellite channels. Unfortunately, radio station broadcasts are restricted to listening to the radio station's selection of music, which may not be desirable. Additionally, many people do not have immediate access to FM/AM/satellite radio station tuners/receivers, except when they are in their vehicles. Some individuals prefer listening to online music services, such as Pandora, that can be listened to on their mobile devices and that provide individualized music content that can be dynamically tailored to the individual's musical tastes. Some online music services can develop a personal radio station for each user that is particularly tailored, over time, to the individual's unique musical tastes, through the individual's feedback on streamed songs and other personal criteria.

In this era of social networking, an individual's real-world and social network "friends" or followers may desire the ability to listen to the individual's personal radio station, as a way of personally connecting with the individual. The individual's real-world and social network friends or followers may also desire the ability to simultaneously listen to whatever music content the individual may be currently listening to on his/her mobile music device. This may be achieved by, for example, receiving streamed music through an online music service or listening to music files stored on the individual's mobile music device. One can imagine that if the individual were a celebrity, or other personality with a large volume of followers, this ability to simultaneously share music content with the individual would be highly coveted. Unfortunately, existing technologies for doing so are lacking.

One popular device for listening to music is a cellular mobile device, or smartphone, which individuals usually carry with them on their person, or in very close proximity, at most times. Existing technologies for simultaneously sharing, in real-time, an audio signal on one personal cellular mobile device with multiple individuals include using the cellular mobile device's speaker to broadcast the audio signal to anyone within listening range. This method only works for simultaneously sharing audio content with individuals that are in close proximity to the cellular mobile device's speaker. Furthermore, the audio content is shared with anyone within listening distance, rather than to a selected group of individuals who desire the ability to listen to the audio content. Another method of simultaneously sharing audio content from one personal cellular mobile device with multiple individuals is plugging a headphone set into an audio output port on the cellular mobile device with multiple pairs of earbuds. This allows multiple listeners to listen to the same audio content, via the earbuds, without broadcasting the audio to unwanted listeners who may also be in the listening vicinity. Unfortunately, this method only allows sharing of audio content with listeners who are in close proximity to the cellular mobile device. In other words, it limits sharing of the audio content to a range associated with the length of the physical wire of the headphone set. Sharing music being played on the cellular mobile device simultaneously to remotely located listeners is not possible with such existing methods.

Another existing technology for sharing music content playing on a personal mobile device with multiple listeners is to pair multiple Bluetooth-enabled headsets with the mobile device and communicate the audio content to each of the headsets via a Bluetooth piconet. Unfortunately, this method is limited to short range wireless communications because Bluetooth communications are limited to a range on the order of meters or less. For example, Bluetooth typically operates within a range of less than ten meters. In addition, Bluetooth networks are limited to seven active devices. More particularly, current Bluetooth protocol allows only one audio receiver slave device, e.g. headset, to be paired to a master device, e.g. cellular mobile phone, at a time. Also, Bluetooth communications have a relatively small data transfer rate of up to approximately 3 Mbps, as compared with other wireless communication protocols, e.g., Wi-fi, which can have data transfer rates of 30 Mbps. Higher data transfer rates can amount to higher sound quality and sharing with more receiver devices.

Another popular method of simultaneously sharing music content is live musical concerts. One of the drawbacks of sharing a musical experience at a live musical concert is that concerts are limited to a predetermined venue and a very limited predetermined time period. Additionally, concert tickets can be relatively expensive and because concerts normally take place at a single venue location, it is not always possible for fans to attend the concert because it is being held too far away. Therefore, what is desired is a device, system, or method that allows audio content from a single music content source, e.g., a cellular mobile device or a speaker at a music concert, to be simultaneously, synchronously communicated, over long distances, to a multitude of remote audio receiver devices. Unfortunately, simultaneously sharing music over long distances presents many technical challenges including establishing high sound quality and secure long range communications, while also communicating data relatively quickly and compensating for propagation delay of the music content from the source transmitting device to the multitude of destination receiver devices.

Further, music content, e.g. a song, is often copyright protected. Therefore, permissions to share the music content should be carefully managed with any music sharing technology to ensure compliance with intellectual property rights.

Therefore, a need exists to overcome the problems with the prior art as discussed above.

SUMMARY OF THE INVENTION

The invention provides a wireless audio communications device, system, and method that overcomes the hereinafore-mentioned disadvantages of the heretofore-known devices and methods of this general type.

With the foregoing and other objects in view, there is provided, in accordance with the invention, a cellular mobile device analog output repeater having an audio plug shaped to mate with an analog audio output port of a cellular mobile device and configured to receive an audio signal from the cellular mobile device via the analog audio output port, the audio signal associated with music content; and a wireless transmitter configured to wirelessly retransmit at least a portion of the audio signal from the analog output port of the cellular mobile device over the Internet to at least one remote audio receiver device.

In accordance with another feature of the present invention, the wireless transmitter wirelessly retransmits the portion of the audio signal using a Wi-fi protocol.

In accordance with another feature of the present invention, the wireless transmitter wirelessly retransmits the portion of the audio signal such that the music content received by the at least one remote audio receiver device is substantially synchronous with the music content output by the cellular mobile device via the analog audio output port.

In accordance with yet another feature of the present invention, the wireless transmitter wirelessly retransmits the portion of the audio signal to a music sharing server system communicatively coupled to the Internet, the music sharing server system detecting the music content associated with the retransmitted audio signal and transmitting the detected music content to the remote audio receiver device from a stored copy of the music content on a database associated with the music sharing server system.

In accordance with a further feature of the present invention, the music sharing server system transmits a portion of the stored copy of the music content corresponding to a timestamp identifying a position in a musical composition associated with the detected music content.

In accordance with yet a further feature of the present invention, a processor of the music sharing server system determines the timestamp.

In accordance with another feature of the present invention, a processor of the cellular mobile device analog output repeater determines the timestamp and communicates the timestamp to the music sharing server system.

In accordance with another feature, an embodiment of the present invention includes an analog to digital converter communicatively coupled to at least a portion of the audio plug and operably configured to convert the audio signal to a digital audio signal before the wireless transmitter wirelessly retransmits the portion of the audio signal.

In accordance with yet another feature, the remote audio receiver device is disposed a distance from the cellular mobile device that exceeds a distance of a local area network.

In accordance with a further feature of the present invention, the wireless transmitter wirelessly retransmits the portion of the audio signal using a Bluetooth protocol.

In accordance with yet a further feature of the present invention, the wireless transmitter wirelessly retransmits the portion of the audio signal to a music sharing server system communicatively coupled to the Internet, the music sharing server system receiving a unique identification of the remote audio receiver device and transmitting the music content associated with the retransmitted audio signal to the remote audio receiver device identified by the unique identification.

In accordance with another feature, an embodiment of the present invention further includes a computer display; and a processor communicatively coupled to the computer display and operable to execute a set of computer executable instructions for displaying on the computer display a software application user interface operable to receive user input for communicating with the music sharing server system over the Internet.

In accordance with the present invention, there is provided a portable wireless plug-in repeater for synchronously sharing music from an audio output device connected to the repeater to a plurality of remote audio receiver devices over the Internet. The repeater has an audio plug shaped to mate with an analog audio output port of an audio output device and configured to receive an audio signal from the audio output device via the analog audio output port. The audio signal is associated with music content. The repeater also includes a wireless transmitter configured to wirelessly retransmit at least a portion of the audio signal from the analog output port of the audio output device over the Internet to at least one remote audio receiver device.

In accordance with the present invention, there is provided a method for dynamic media distribution. An audio content server system receives, from a computing device of a first user, a request to follow a second user; and designates the first user as a follower of the second user as a result of the first user's request to follow the second user. Further, the audio content server system receives, from a computing device of a third user, a request to follow the first user; and designates the third user as a follower of the first user as a result of the third user's request to follow the first user. A request to stream a first audio content is received from a computing device of the second user. As a result, the audio content server system identifies a plurality of followers of the second user as a result of the second user's request to stream the first audio content, the first user among the plurality of followers of the second user. The audio content server system synchronously streams the first audio content to the second user and the plurality of followers of the second user as a result of the second user's request to stream the first audio content, wherein the step of synchronously streaming the first audio content includes streaming the first audio content to the first user and the third user. While performing the step of synchronously streaming the first audio content, the audio content server system receives a request from the computing device of the first user to stream a second audio content, different from the first audio content. The audio content server system identifies a plurality of followers of the first user as a result of the first user's request to stream the second audio content, the third user among the plurality of followers of the first user. Independent of the synchronous streaming of the first audio content to the second user, the audio content server system ends the synchronous streaming of the first audio content to the first user and the third user and synchronously streams the second audio content to the first user and the plurality of followers of the first user as a result of the first user's request to stream the second audio content.

In accordance with another feature of the present invention, the step of synchronously streaming the second audio content includes streaming the second audio content to the third user automatically, without receiving a request from the third user to stream the second audio content.

In accordance with another feature of the present invention, the step of designating the first user includes configuring an account of the first user to automatically transmit, by the audio content server system, to the computing device of the first user, a real-time copy of an audio stream transmitted to the computing device of the second user such that the audio stream and the real-time copy are played substantially synchronously on the computing devices of the first and the second user, said computing devices communicatively coupled over the Internet.

In accordance with yet another feature of the present invention, the first user, the second user, and the third user each have a user account with the audio content server system, each user account associated with a username and a password that provides the corresponding user with access to the audio content server system.

In accordance with a further feature of the present invention, the audio content server system ends the synchronous streaming of the second audio content to the first user; and as a result of the step of ending the synchronous streaming of the second audio content to the first user, the audio content server system automatically ends the synchronous streaming of the second audio content to the third user as a result of the third user being a follower of the first user and without receiving a request from the third user to end said synchronous streaming.

In accordance with yet a further feature, an embodiment of the present invention includes, while performing the step of synchronously streaming the first audio content to the first user, the second user, and the third user, continuously monitoring, by the audio content server system, a latency period for the computing devices of the first user, the second user, and the third user and adjusting a streaming speed to each of the computing devices based on the latency period.

In accordance with yet another feature, an embodiment of the present invention includes, while performing the step of synchronously streaming the first audio content to the first user, the second user, and the third user, repetitively calculating, by the audio content server system, a latency period for the computing devices of the first user, the second user, and the third user and adjusting a timing for transmitting data packets associated with the first audio content to each of the computing devices so that the first audio content is played on each of the computing devices synchronously to within less than about a 20 millisecond delay.

In accordance with another feature, an embodiment of the present invention includes receiving, by the audio content server system, from a computing device of a fourth user, a request to follow the third user; and designating, by the audio content server system, the fourth user as a follower of the third user as a result of the fourth user's request to follow the third user. The audio content server system synchronously streams the second audio content to the fourth user as a result of designating the fourth user as a follower of the third user. Further, the audio content server system receives from a computing device of the third user a request to stream a third audio content, different from the first and second audio content. As a result, the audio content server system identifies a plurality of followers of the third user as a result of the third user's request to stream the third audio content, the fourth user among the plurality of followers of the third user. Independent of the synchronous streaming of the first audio content to the second user and the second audio content to the first user, the audio content server system ends the synchronous streaming of the second audio content to the third user and the fourth user and synchronously streams the third audio content to the third user and the plurality of followers of the third user as a result of the third user's request to stream the third audio content.

In accordance with a further feature, an embodiment of the present invention includes a server system for dynamic media distribution. The server system has at least one network connection communicatively coupled to the Internet; and at least one processor communicatively coupled to the at least one network connection. The at least one processor is operable to receive, over the at least one network connection, from a computing device of a first user, a request to follow a second user; designate the first user as a follower of the second user as a result of the first user's request to follow the second user; receive, over the at least one network connection, from a computing device of a third user, a request to follow the first user; and designate the third user as a follower of the first user as a result of the third user's request to follow the first user. Further, the at least one processor is operable to receive, over the at least one network connection, from a computing device of the second user, a request to stream a first audio content; synchronously stream, over the at least one network connection, the first audio content to the second user and a plurality of followers of the second user, the first user among the plurality of followers of the second user and the synchronous streaming of the first audio content includes streaming the first audio content to the first user and the third user; receive, over the at least one network connection, a request from the computing device of the first user to stream a second audio content, different from the first audio content; and independent of the synchronous streaming of the first audio content to the second user, end the synchronous streaming of the first audio content to the first user and the third user and synchronously stream, over the at least one network connection, the second audio content to the first user and a plurality of followers of the first user, the third user among the plurality of followers of the first user and the synchronous streaming of the second audio content includes streaming the second audio content to the third user.

In accordance with another feature, an embodiment of the present invention includes a method of receiving and controlling synchronous communications, the method comprising steps of sending, by a first computing device, to an audio content server system, a request to follow a first user of the audio content server system; and receiving, by the first computing device, from an audio content server system, a stream of a first audio content. The first audio content is also synchronously streamed, by the audio content server system, to the first user as a result of the audio content server system designating a user associated with the first computing device as a follower of the first user and the audio content server system receiving a request from the first user to synchronously stream the first audio content to the first user and a plurality of followers of the first user. While performing the step of receiving the synchronous stream of the first audio content, the method includes sending, by the first computing device, to the audio content server, a request to stream a second audio content, different from the first audio content; and as a result of the request to stream the second audio content, receiving, by the first computing device, from the audio content server, a stream of the second audio content that is also synchronously streamed, by the audio content server, to remote computing devices of a plurality of followers of the user associated with the first computing device.

In accordance with yet another feature, an embodiment of the present invention includes sending, to the audio content server system, a time-stamped packet that also includes an estimate of the total-time-on-device (TOD) for the first computing device.

In accordance with a further feature of the present invention, the first computing device plays the second audio content substantially synchronously with playback of the second audio content on the remote computing devices of the plurality of followers to within less than about a 20 millisecond delay between each of the remote computing devices.

In accordance with yet a further feature of the present invention, an embodiment includes sending, by the first computing device, to the audio content server system, a request to follow a second user of the audio content server system, the second user different from the first user; and as a result of the request to follow the second user, receiving, by the first computing device, from the audio content server, an audio stream that is identical to and substantially synchronous with an audio stream transmitted to computing devices of the second user and a plurality of followers of the second user.

Although the invention is illustrated and described herein as embodied in a wireless audio communications device, system, and method, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. while the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the portable plug-in repeater. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
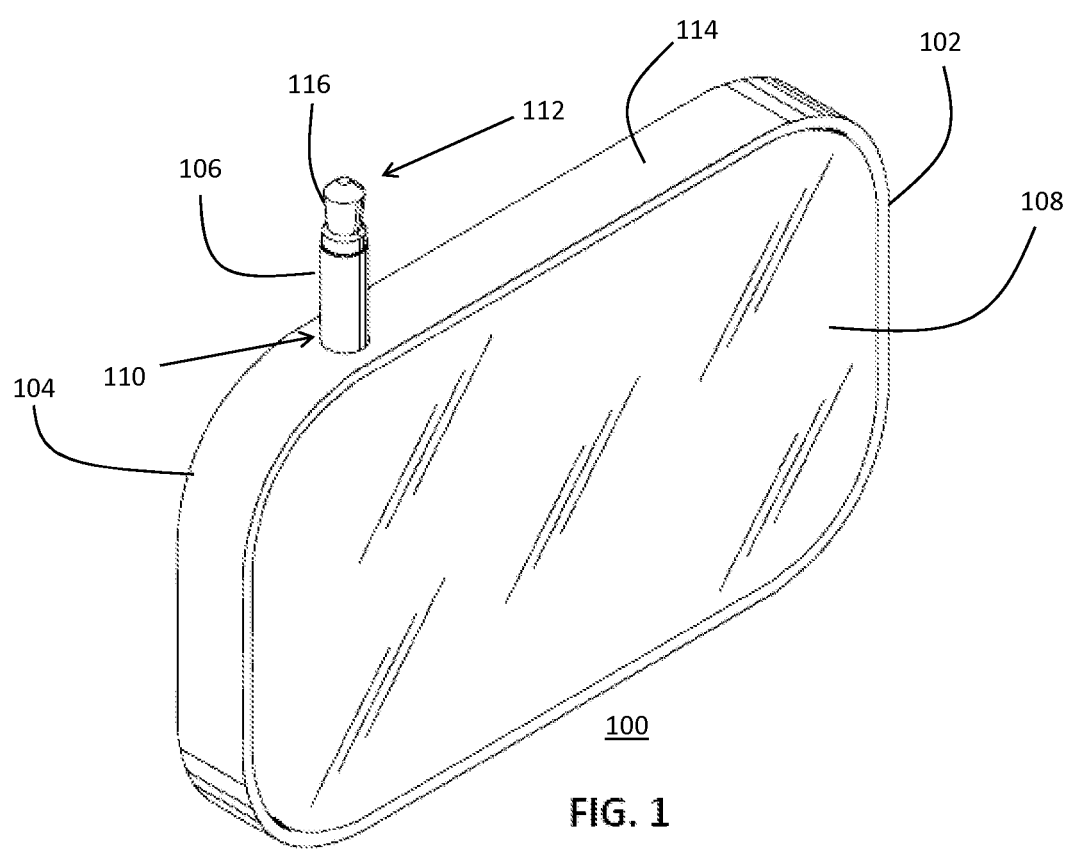
FIG. 1 is a perspective view of a wireless plug-in repeater in accordance with an embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides, in accordance with one embodiment, a novel and efficient portable wireless plug-in repeater that plugs into an audio output of an audio processing device. The repeater is able to synchronously share music from the audio output of the audio processing device with at least one remote audio receiving device over a wireless network. Embodiments of the invention provide for a portable wireless plug-in repeater that allows for secure synchronous sharing of music files over a long range wireless communications channel to a plurality of remote audio receiving devices. In addition, embodiments of the invention provide for a plug-in repeater having a housing enclosing various electronic components, including a processor, a wireless network interface with an antenna, a user-input interface, a display, a processor, a USB port, and an analog to digital converter (ADC). In one embodiment, the audio plug protrudes outwardly from an external surface on the housing so as to be insertable within a standard audio jack, or audio output port of a portable electronic device, such as a cellular communication device. In a further embodiment, analog signals transmitted via the standard audio jack and received by the audio plug are converted to digital audio signals by an analog to digital converter ("ADC"). The converted digital audio signals may then be encrypted and transmitted via the antenna over a network capable of long range communications, such as a Wi-fi network. The term "Wi-fi" refers to a wireless local area network (WLAN) that uses the IEEE 802.11 protocol standard. As is known in the art, Wi-fi technology is often used to provide Internet access to devices within the range of the Wi-fi WLAN, which is usually provided by an access point, such as a Wi-fi router. Wi-fi also allows for direct computer-to-computer communications via a peer-to-peer ad hoc network for short range communications. In alternative embodiments, the converted audio signal can be transmitted to remote audio output devices through other wireless network protocols.

In further embodiments, the plug-in repeater can be plugged into audio output devices other than a cellular mobile phone, e.g. a speaker, a headset, etc. Advantageously, any analog audio output from a standard audio jack, or audio output port can be received by the plug-in repeater and then synchronously shared with remote audio receiver devices over a wireless network.

Some embodiments of the invention include a particular social networking aspect. For example, the processor on the plug-in repeater can execute computer instructions for communicating with a remote music sharing server system that manages the social networking aspect of the present invention. More particularly, the remote music sharing server system can include a database that stores music files of the social network's users and each user's associated listening permissions. In some embodiments, the music files can be associated with a third-party music server system, e.g. iTunes, which has granted licenses to users to download and listen to the music files. An indication of such legal permissions may be stored in the database and associated with each music file so that only users with legal permission may listen to the music file and any "friends" who desire to share the music content may only listen to the music files simultaneously with the user having legal permission to listen to the music file. In addition, the database can store identification information for users' audio output devices, which are registered with the remote music sharing server system and can be used by the remote music sharing server system to identify, locate, and remotely synchronously share music content with said audio output devices. Users associated with the remote music sharing server system may, in some embodiments, be able to view and access their friends' audio output devices in order to initiate synchronously sharing music content to selected audio output devices. Accordingly, the present invention provides a social networking platform with a music sharing server system in wireless communication with plug-in repeaters and other audio input/output devices that allows users to leverage their friends' music content permissions to listen to music with their friends' in a synchronous/simultaneous manner over long range wireless communications networks. In one embodiment, a software application may be provided to allow a friend to purchase a license (and/or download the song) in order to be able to listen to the song independently from his/her friend, or otherwise have legal permission to listen to the song independently. Accordingly, music companies may obtain additional profits from such music purchases. Although the following description will focus primarily on long range wireless communications, it is understood that the synchronous sharing of music content may, in some embodiments, occur over short range wireless communications, as well as, wired communications. In addition, although the description below discusses "music content" and "songs," it is understood that, in some embodiments, the synchronously shared content may include other audio content, such as voice, or may include other digital content, such as, for example, video content.

Referring now to FIG. 1, one embodiment of the present invention is shown in a perspective view. FIG. 1 shows several advantageous features of the present invention, but, as will be described below, the invention can be provided in several shapes, sizes, combinations of features and components, and varying numbers and functions of the components. The first example of a wireless plug-in repeater 100, as shown in FIG. 1, includes a body 102 having a housing 104 and an audio plug 106 protruding from an exterior surface of the housing 104.

Figure 2:
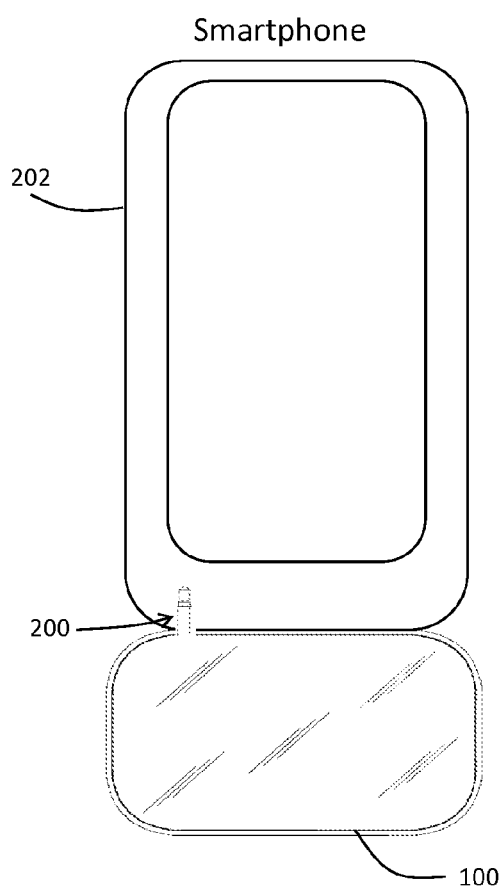
FIG. 2 is a front elevational view of the wireless plug-in repeater plugged-into a mobile device in accordance with the present invention.

In one embodiment, the housing 104 defines an interior area where a plurality of electronic components are disposed, which electronic components will be described in more detail below, with reference to FIG. 3. In a preferred embodiment, the wireless plug-in repeater 100 is sized and configured as a portable wireless plug-in repeater 100 that couples to a mobile device, such as a smartphone, such that the housing 104 has a smaller overall surface area than a standard-sized smartphone (see. FIG. 2). Accordingly, coupling the wireless plug-in repeater 100 to a standard-sized smartphone may not inconvenience users that are accustomed to the relatively small and portable form factor of such handheld devices. Although the device 100 is referred to herein as a "repeater," it is in no way limited to only repeating audio or other data. The term "repeater" is only being used to simplify the instant discussion of certain embodiments and, as will be explained later, the device 100 is capable of generating its own content and receiving signals, data, and other information from the devices it transmits to.

In one embodiment, the housing 104 may include a width that is equal to or less than a width of a standard-sized smartphone. In another embodiment, the housing 104 may include a width that is only slightly wider than the width of a standard-sized smartphone. In yet another embodiment, the housing 104 includes a length that is less than a length of a standard-sized smartphone. In a further embodiment, the housing 104 includes a length that is less than one-half the length of the standard-sized smartphone. In yet a further embodiment, the housing 104 may include dimensions outside of these ranges. Although the housing 104 is depicted as rectangular-shaped with rounded corner edges, it is understood that, in some embodiments, the housing 104 may be formed as other shapes, sizes, and configurations. In one embodiment, the wireless plug-in repeater 100 may be non-portable. In other words, the wireless plug-in repeater 100 may be larger than the standard-sized smartphone. In another embodiment, the wireless plug-in repeater 100 may be sized and configured to couple to devices substantially smaller than the standard-sized smartphone (e.g., a smart watch).

In one embodiment, the housing 104 at least partially defines a USB port (not shown) or other data input/output port for communicatively coupling the wireless plug-in repeater 100 to a computing device (e.g. personal computer). Coupling the wireless plug-in repeater 100 to the computing device may allow the user to initially register the repeater 100 with a music sharing server system associated with the social networking aspect of the present invention. In a further embodiment, the USB port or other data input/output port may be used to obtain large volumes of music content from the computing device during the initial registration phase in order to transfer or copy the music content to the music sharing server system. This would allow for remote distribution of the music content to a plurality of audio receiver devices, from the music sharing server system, during synchronous music content sharing sessions, in accordance with some embodiments of the present invention. In addition, authentication and security protocols may be established during this initial registration phase. In one embodiment, the USB port may be used by the user to plug-in a USB headset for listening to the music content from the wireless plug-in repeater 100. Alternatively, the user may listen to the music content via another wired or wireless connection, such as, a Bluetooth headset.

In one embodiment, the housing 104 may include a computer display 108. In another embodiment, the computer display 108 may be configured as a touchscreen for allowing a user to input commands that are received by the electronic components within the interior area of the housing 104. The computer display 108 can be any type of suitable display, such as a liquid-crystal display (LCD), a plasma display, a light-emitting diode (LED) display, or the like, that may be used to present various images, text, graphics, icons, or videos to the user. The computer display 108 may display a keypad (not shown) that may include alphanumeric keys for allowing entry of alphanumeric information (e.g. log-in user names and passwords, contact information, text, etc.). The touchscreen may also provide output or feedback to the user, such as haptic feedback or orientation adjustments of the keypad according to sensor signals received by motion detectors, such as an accelerometer, located within the wireless plug-in repeater 100. The computer display 108 may display information to the user such as an operating state, time, various menus, application icons, pull-down menus, input fields, music content titles, artists, albums, etc., and the like.

In one embodiment, the computer display 108 may be configured to display a software application interface for the social networking aspect of the present invention, discussed in more detail herein below. Advantageously, because the software application is configured for execution on the wireless plug-in repeater 100, rather than a smartphone, the software application need not be purchased or otherwise acquired or downloaded with any fees or restrictions associated with the smartphone, or smartphone manufacturer. It is known that some smartphone manufacturers, e.g., APPLE, require that users download and purchase software applications configured for execution on a mobile device (e.g., tablet or smartphone), i.e, "apps," through proprietary software applications and systems. Further, app developers are required to develop the apps through proprietary systems and protocols, which can increase the costs of app development and ultimately affect end user purchase prices and profit margins for app developers. In a further embodiment, the wireless plug-in repeater 100 may not include a software application or the computer display 108. In this embodiment, user inputs and outputs may be provided through other configurations, components, or peripheral devices.

In one embodiment, the audio plug 106 includes a first end 110 and a second end 112 opposite the first end 110. The first end 110 may be coupled to and protrude outwardly from at least a portion of an external surface 114 of the housing 104. In one embodiment, the first end 110 is removeably couplable to the housing 104. This may be useful for embodiments that allow users to interchange audio plugs of varying sizes and configurations. In an alternative embodiment, the first end 110 is integral or unitary with the housing 104. In yet another embodiment, the first end 110 is coupled to the housing 104 so as to not be removable from the housing 104 without damaging the wireless plug-in repeater 100.

Referring still to FIG. 1 with reference to FIG. 2, in one embodiment, the second end 112 is disposed external to the housing 104. The second end 112 may include an external surface 116 defining at least one electrically conductive region operably configured to be insertable within an audio output port 200 of an audio output device 202 for receiving an analog signal from the audio output device 202. As used herein, the term "audio output device" is intended to indicate any device operable to output analog audio signals. In a preferred embodiment, the analog signal is an analog audio signal associated with a music content, such as a song or other musical composition. In another embodiment, the analog signal may be other analog signals, such as a microphone audio signal. The audio output device 202 may be a smartphone, a headset, a microphone headset, a speaker, a musical instrument, a computer tablet, a personal computer, or other computing device, and the like. The audio output port 200 may be an audio jack. Known jacks include single prong monoaural or stereo jack and double prong jacks. Most portable audio devices use 3.5 mm jacks, although smaller and larger jacks are known. For example, 2.5 mm jacks may be used in some embodiments and 6.35 mm jacks may be used by some audio output devices, such as home or professional audio output equipment.

Figure 3:
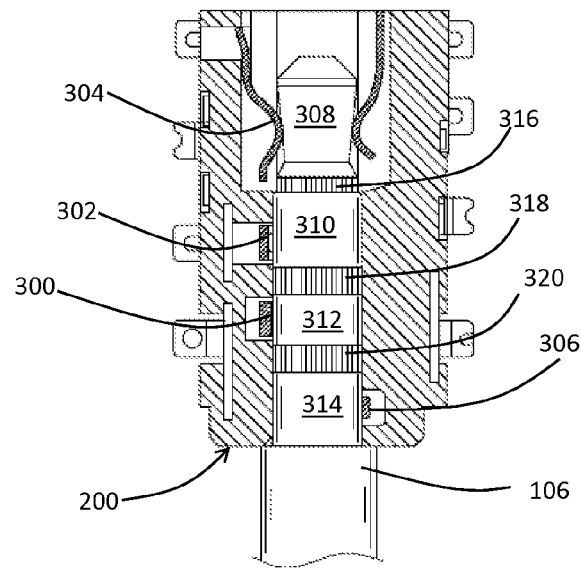
FIG. 3 is an enlarged, cross-sectional view of FIG. 2, illustrating a connection between the wireless plug-in repeater and the mobile device, in accordance with the present invention.

Referring primarily to FIG. 3 with reference to FIG. 2, an exemplary jack-and-plug coupling is illustrated in a partial, enlarged cross-sectional view of FIG. 2. The audio plug 106 of the wireless plug-in repeater 100 is shown inserted within at least a portion of the audio output port 200 of the audio output device 202. In one embodiment, the audio plug 106 is electrically couplable to the audio output port 200 of the audio output device 202 for receiving from and, in some embodiments, transmitting signals to the audio output device 202. The audio output device 202 may include a digital-to-analog converter (DAC) for converting digital signals from a processor within the device 202 into analog signals that can be output via the audio output port 200. In one embodiment, the DAC may provide left and right analog audio signals to the audio output port 200 for stereo audio communications. In a further embodiment, the audio output device 202 may also include an analog-to-digital converter (ADC) for converting analog signals (e.g., microphone audio signals) received via the audio output port 200 into digital signals that can be communicated to the processor within the device 202. In yet a further embodiment, the analog signal may be a microphone analog signal.

In one embodiment, the audio output port 200 is configured to receive an audio plug 106 of a predetermined length, diameter, and electrical configuration. For example, the audio output port 200 may include four electrically conductive terminals 300, 302, 304, and 306 at predetermined positions within the audio output port 200. The terminals 300, 302, 304, and 306 may be configured to electrically couple with predetermined electrically conductive regions 308, 310, 312, and 314 on the audio plug 106. In one embodiment, the electrically conductive regions 308, 310, 312, and 314 may be separated by electrically isolating regions 316, 318, and 320. In another embodiment, for stereo communications, regions 308 and 310 may be dedicated to left and right audio signals and regions 312 and 314 may be dedicated to ground. In yet another embodiment, for non-stereo communications, region 308 may be dedicated to audio speaker signals; regions 310 and 312 may be for ground; and region 314 may be for a microphone signal. In one embodiment, the audio output port 200 may include three electrically conductive terminals for coupling with an audio plug 106 having three electrically conductive regions. In yet other embodiments, the audio output port 200 may include more than four or less than three electrically conductive terminals. In a further embodiment, the audio plug 106 may include more than four or less than three electrically conductive regions. In a preferred embodiment, the audio plug 106 is a 3.5 mm audio plug with four electrically conductive regions separated by three electrically isolating regions.

Figure 4:
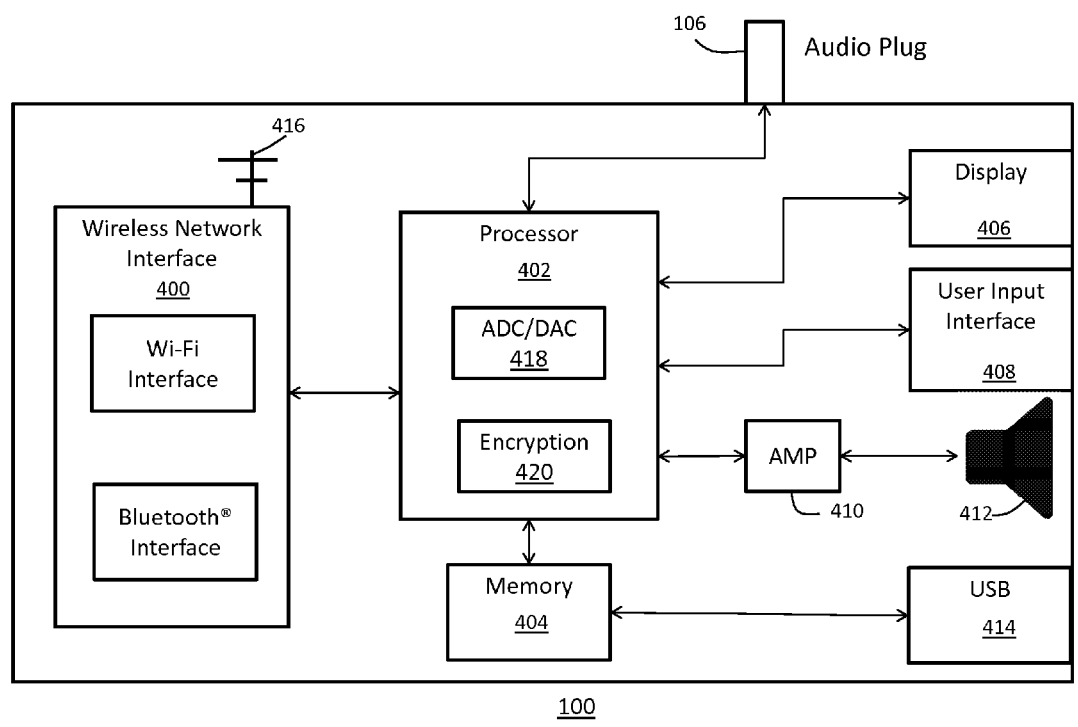
FIG. 4 is a block diagram of another exemplary embodiment of a wireless plug-in repeater, in accordance with the present invention.

Referring now to FIG. 4, an exemplary embodiment of the wireless plug-in repeater 100 is illustrated in a block diagram. In one embodiment, the wireless plug-in repeater 100 includes a wireless network interface 400, a processor 402, a memory 404, a display 406, a user input interface 408, an amplifier 410, a speaker 412, a digital data port 414, and the audio plug 106.

In one embodiment, the wireless network interface 400 may include one or more network interface cards (NIC) or a network controller. The wireless network interface 400 can be hardware and/or a computer program that is responsible for wireless communications. The wireless network interface 400 may include an antenna 416. In one embodiment, the antenna 416 is a radio frequency transmitter and/or receiver for transmitting and receiving radio frequency signals. In another embodiment, the antenna 416 is a radio frequency transceiver. In one embodiment, the analog audio signals received via the audio plug 106 are converted into digital signals by an ADC and subsequently transmitted wirelessly via the antenna 416 over a wireless network. Although the wireless network interface 400 is discussed as providing for wireless communications, in some embodiments, the wireless network interface 400 may also include hardware and/or software components configured to provide wired communications.

In some embodiments, the wireless network interface 400 may include a personal area network (PAN) interface. The PAN interface may provide the capability for the wireless plug-in repeater 100 to network using a short-range communication protocol, for example, a Bluetooth communication protocol. Bluetooth is an industrial specification for wireless PANs. Bluetooth provides a way to connect and exchange information between devices such as smartphones, laptops, PCs, printers, digital cameras, and video game consoles via an unlicensed, short range radio frequency. Bluetooth typically operates at a frequency of about 2.4 GHz. In order to use Bluetooth wireless technology, a device must be able to interpret certain predefined Bluetooth profiles. The profiles define the possible applications that work with the device. Bluetooth profiles define general behaviors through which Bluetooth-enabled devices communicate with other devices. Bluetooth technology defines a wide range of profiles that describe many different types of use cases. At a minimum, each profile specification contains information on the following topics: dependencies on other profiles; suggested user interface formats; and specific parts of the Bluetooth protocol stack used by the profile. To perform its task, each profile uses particular options and parameters at each layer of the stack. The configuration information regarding a profile is in the upper layers of a Bluetooth stack, typically an application layer. The proper profile for a device must be used to establish communication with the device. Beyond those profiles typically needed for general operation, well over twenty device class profiles currently exist. For example, Advanced Audio Distribution Profile (A2DP) is designed to transfer a 2-channel stereo audio stream, like music from an MP3 player, to a headset or car radio. The Headset Profile (HSP) is the most commonly used profile, providing support for Bluetooth headsets to be used with smartphones. It provides for audio communications and relies on a subset of commands to provide minimal controls, including the ability to ring, answer a call, hang up and adjust volume. Other profiles exist for operations, such as, for example printing, transferring files, and video streaming.

In one embodiment, the PAN interface may permit the wireless plug-in repeater 100 to connect wirelessly to another electronic device (e.g., an audio receiver device) via a peer-to-peer, ad hoc connection. For example, in one embodiment, the wireless network interface 400 may include a Wi-fi interface that is configured to support short range, peer-to-peer ad hoc communications. Ad hoc networks allow devices to communicate directly with each other in a peer-to-peer configuration, without requiring an access point, such as a Wi-fi router.

The wireless network interface 400 may also include a local area network (LAN) interface. The LAN interface may be, for example, an interface to a wireless LAN, such as a Wi-fi network. In one embodiment, there is a wireless LAN located at or near the wireless plug-in repeater 100 that provides the wireless plug-in repeater 100 with access to the Internet for communicating with the music sharing server system to manage long range communications, such as synchronously sharing music content over long distances and sending and receiving identification, authentication, timing, and control commands in accordance with the present invention. The range of the LAN interface may generally exceed the range available via the PAN interface. Typically, a connection between two electronic devices via the LAN interface may involve communication through a network router or other intermediary device. More particularly, the wireless network interface 400 may include the capability to connect to a wide area network (WAN), such as the Internet, via an access point, such as a Wi-fi network router associated with a wireless LAN. Because the wireless plug-in repeater 100 is intended for connection to a multitude of devices via the audio plug 106, including a smartphone, the wireless plug-in repeater 100 may not include a cellular mobile communications network interface.

The wireless network interface 400 preferably includes a Wi-fi interface, or IEEE 802.11. In one embodiment, the wireless network interface 400 includes a Wi-fi modem for wirelessly connecting to a Wi-fi access point (AP) that may be considered a router, a gateway, or a hotspot. Currently, APs have a range of about 30-150 meters indoors and an even longer range outdoors. Wi-fi networks are generally considered less secure than its wired counterpart, Ethernet communications, or Bluetooth networks. On the other hand, Wi-fi networks are able to connect to more devices than Bluetooth networks and offer a much longer range of wireless communications than Bluetooth.

In one embodiment, the wireless plug-in repeater 100 may also include a near field communication (NFC) interface. The NFC interface may allow for extremely close range communication at relatively low data rates (e.g., 424 kb/s). The NFC interface may take place via magnetic field induction, allowing the NFC interface to communicate with other NFC interfaces located on other electronic mobile devices. The NFC interface may enable initiation and/or facilitation of data transfer from the wireless plug-in repeater 100 to another electronic device with an extremely close range (e.g. 4 centimeters).

The processor 402 can be, for example, a central processing unit (CPU), a microcontroller, or a microprocessing device, including a "general purpose" microprocessing device or a special purpose microprocessing device. The processor 402 executes code stored in the memory 404 in order to carry out operation/instructions of the wireless plug-in repeater 100. The processor 402 may provide the processing capability to execute an operating system, run one or more applications, and provide processing for one or more of the techniques described herein.

In one embodiment, the processor 402 includes an ADC and/or a DAC 418. Although the ADC/DAC unit 418 is depicted as part of the processor 402 in FIG. 4, it is understood that, in other embodiments, the ADC/DAC 418 may be separate from and communicatively coupled to the processor 402. For example, in an alternative embodiment, the ADC/DAC 418 may be communicatively coupled between the processor 402 and the audio plug 106. Further, the ADC/DAC 418 may be implemented as a single unit in some embodiments, or as separate ADC and DAC components in other embodiments. In one embodiment, the ADC is operable to convert analog data into digital data at a rate of approximately 192 kHz, which is approximately five times the resolution of a typical music CD. Advantageously, providing an ADC that is able to convert analog into digital at a relatively high rate, as compared with other methods, provides a higher quality musical sound. In another embodiment, the ADC may be operable to convert analog data into digital data at rates higher than 1.5 MBS.

In a further embodiment, the wireless plug-in repeater 100 may include an encryption module 420. The encryption module 420 may be included in the processor 402, or may be communicatively coupled to and separate from the processor 402. The encryption module 420 may be a software program configured to apply one or more encryption techniques to the analog audio signals received via the audio plug 106, or other data. In yet a further embodiment, the analog audio signals are converted into digital signals by the ADC/DAC 418 prior to applying the one or more encryption techniques. Because Wi-fi networks are considered less secure than Bluetooth networks, the encryption module 420 may be provided as an additional layer of security for wireless communications over the Wi-fi network. In one embodiment, the processor 402 is a high-speed processor. The processor 402 is preferably a relatively high-speed processor in order to process a high rate of analog-to-digital conversion for high sound quality and for applying the encryption techniques to the data.

The memory 404 associated with the wireless plug-in repeater 100 may be, for example, one or more buffer, a flash memory, or non-volatile memory, such as random access memory (RAM). The wireless plug-in repeater 100 may also include non-volatile storage. The non-volatile storage may represent any suitable storage medium, such as a hard disk drive or non-volatile memory, such as flash memory or an EEPROM.

The display 406 displays information to the user such as an operating state, time, various menus, icons, pull-down menus, application interfaces, and the like. The display 406 may be used to present various images, text, graphics, icons, or videos to the user. The display 406 may be any type of suitable display, such as a liquid-crystal display (LCD), a plasma display, a light-emitting diode (LED) display, or the like.

The user input interface 408 allows the user to provide inputs to the wireless plug-in repeater 100. The user input interface 408 may also facilitate interaction between the user and the repeater 100. The user input interface 408 may include a keypad providing a variety of user input operations. For example, the keypad may include alphanumeric keys for allowing entry of alphanumeric information (e.g. telephone numbers, contact information, text, etc.). The user input interface 408 may include special function keys (e.g. a volume control buttons, back buttons, home button, etc.), navigation and select keys, a pointing device, and the like. Keys, buttons, and/or keypads may be implemented as a touchscreen associated with the display 406. The touchscreen may also provide output or feedback to the user, such as haptic feedback or orientation adjustments of the keypad according to sensor signals received by motion detectors, such as an accelerometer, located within the repeater 100.

The wireless plug-in repeater 100 preferably provides the user with the capability of listening to the music content that is either received via the audio plug 106, or through another input, such as the wireless network interface 400 or the digital data port 414. Accordingly, in one embodiment, the wireless plug-in repeater 100 may include the amplifier 410. The amplifier 410 may be communicatively coupled to the speaker 412 for amplifying audio signals that are transmitted to the speaker 412. The speaker 412 uses the audio signals to cause vibrations that produce sounds waves. In other embodiments, the user may listen to the music content through other audio receiver devices, such as a USB headset or a Bluetooth headset.

The digital data port 414 functions to allow digital data to be communicated through a wired connection, which may be particularly useful for the initial registration of the wireless plug-in repeater 100 with the music sharing server system and also for transferring a large volume of data and/or music files. In one embodiment, the digital data port 414 may be a universal serial bus (USB) port. The USB port may be configured to connect with any one of a plurality of USB connector types, including an A-type connector, a B-type connector, a micro-USB connector, a USB Mini-b connector, a USB 3.0 connector, and the like. In another embodiment, data ports other than a USB port may be utilized to provide a wired connection to another electronic device, such as a PC, a computer tablet, and the like.

Figure 5:
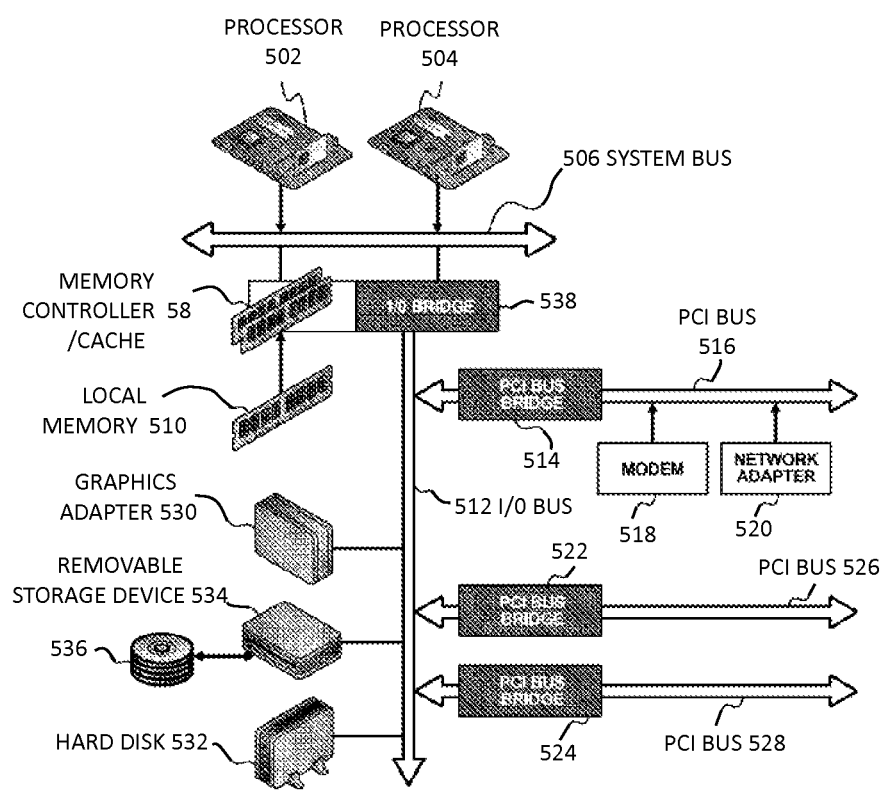
FIG. 5 is a block diagram of a data processing system in accordance with an embodiment of the present invention.
Figure 6:
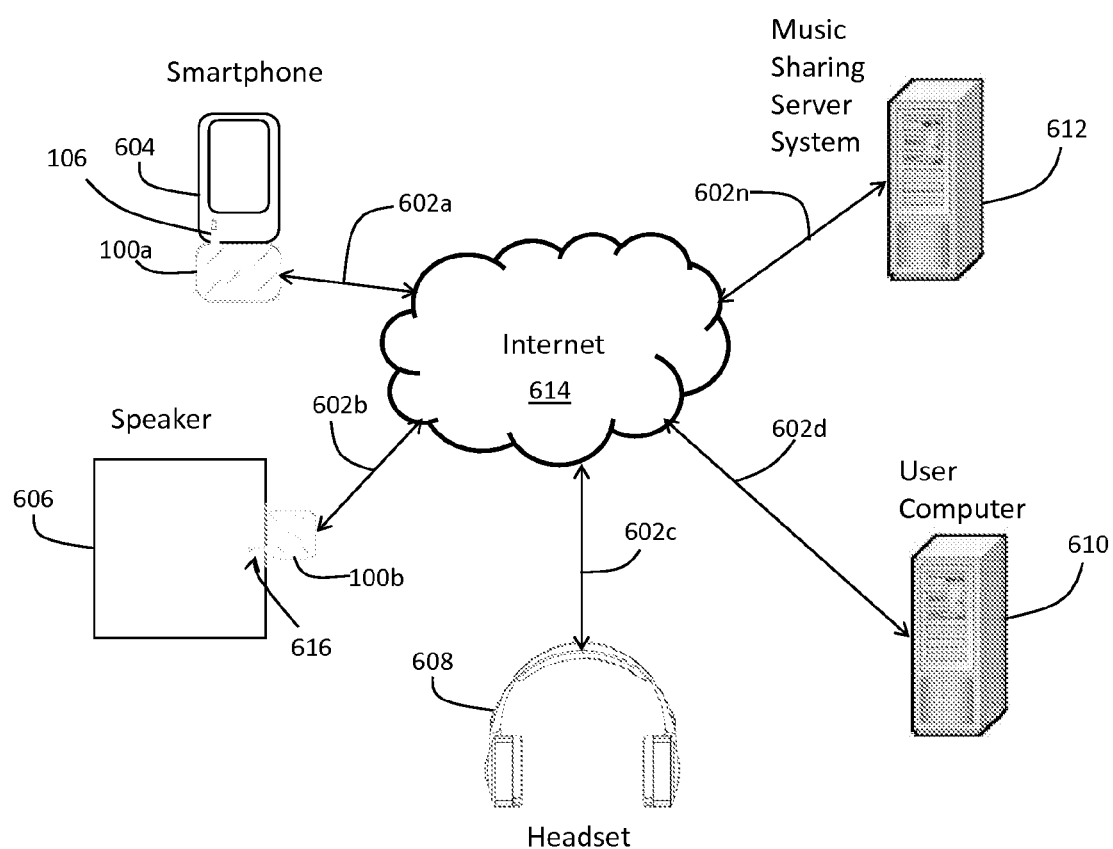
FIG. 6 is a block diagram of an exemplary network in accordance with an exemplary embodiment of the present invention.

Referring to FIG. 5, a block diagram of a data processing system 500 is shown that may be implemented as a server within the music sharing server system, or implemented as a personal computer (PC), smartphone, or other computing device coupled to a network 600, as shown in FIG. 6, in accordance with an embodiment of the present invention. The data processing system 500 may be a symmetric multiprocessor (SMP) system including a plurality of processors 502 and 504 connected to system bus 506. Alternatively, a single processor system may be employed. Also, connected to system bus 506 is memory controller/cache 508, which provides an interface to local memory 510. An I/O bus bridge 538 is connected to system bus 506 and provides an interface to I/O bus 512. The memory controller/cache 508 and I/O bus bridge 538 may be integrated as depicted. The processor 502 or 504 in conjunction with memory controller 508 controls what data is stored in memory 510. The processor 502 and/or 504 and memory controller 508 can serve as a data counter for counting the rate of data flow to the memory 510 or from the memory 510 and can also count the total volume of data accessed to or from the memory 510. The processor 502 or 504 can also work in conjunction with any other memory device or storage location.

Peripheral component interconnect (PCI) bus bridge 514 connected to I/O bus 512 provides an interface to PCI local bus 516. A number of modems 518, or wireless cards, may be connected to PCI bus 516. Typical PCI bus implementations will support four PCI expansion slots or add-in connectors. PCI includes, but is not necessarily limited to, PCI-X and PCI Express components. Communications links to the network of computers in FIGS. 1 and 2 may be provided through the modem 518 and network adapter 520 connected to PCI local bus 516 through add-in boards.

Additional PCI bus bridges 522 and 524 provide interfaces for additional PCI buses 526 and 528, from which additional modems or network adapters may be supported. In this manner, the data processing system 500 allows connections to a multiple network of computers. A graphics adapter 530 and hard disk 532 may also be connected to I/O bus 512 as depicted, either directly or indirectly.

Those of ordinary skill in the art will appreciate that the hardware depicted in FIG. 5 may vary. For example, other peripheral devices, such as optical disk drives and the like, also may be used in addition to or in place of the hardware depicted. The depicted example is not meant to imply architectural limitations with respect to the present invention.

The processes explained in detail herein can be embodied in a computer program. Computer programs (also called computer control logic) are stored in memory such as main memory 510, removable storage drive 534, removable media 536, hard disk 532, and signals. Such computer programs, when executed, enable the computer system to perform the features of the present invention as discussed herein. In particular, the computer programs, when executed, cause the processor 502 and/or 504 to perform one or more of the features described herein.

In this document, the terms "computer program medium," "computer usable medium," and "computer readable medium" are used to generally refer to media such as main memory 510, removable storage drive 534, removable media 536, hard disk 532, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer/programming instructions, between computer systems. Furthermore, the computer readable medium may comprise computer readable information in a transitory state medium such as a network link and/or a network interface, including a wired or wireless network, which allows a computer to read such computer readable information.

Referring now to FIG. 6, an exemplary embodiment of the network 600 in accordance with the present invention is illustrated in a block diagram. The network 600 includes connections 602*a-n*, which are the medium used to provide communications links between various devices and computers connected together within the network 600. The connections 602*a-n* may be wired or wireless connections. A few exemplary wired connections are cable, phone line, and fiber optic. Exemplary wireless connections include radio frequency (RF) and infrared radiation (IR) transmission. Many other wired and wireless connections are known in the art and can be used with the present invention.

In the depicted example, the network 600 includes a mobile electronic device 604, a speaker 606, a headset 608, a user computer 610, and a music sharing server system 612, communicatively coupled to the network 600. As will be described further herein, the music sharing server system 612 manages communications between client devices, such as the mobile electronic device 604, the speaker 606, and the headset 608.

In the depicted example, the network 600 can include the Internet 614, which represents a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, the network 600 also may be implemented as a number of different types of networks, such as for example, an Intranet, a LAN, a peer-to-peer network, or another WAN. FIG. 6 is intended as an example, and not as an architectural limitation for the present invention.

For convenience, the mobile electronic device 604 will be referred to herein below as a smartphone. However, it should be understood that features of the invention may be carried out using other types of mobile electronic devices, such as, for example, computer tablets, personal digital assistants, music player devices, and the like. The smartphone 604 may be used to play music content. More particularly, the smartphone 604 may include the audio output port 200 (FIG. 2) for communicating an analog audio output signal associated with the music content. In one embodiment, the smartphone 604 is plugged-in to the audio plug 106 of the wireless plug-in repeater 100a for receiving the analog audio output signal and synchronously sharing the music content associated with the analog audio output signal with remote audio receiver devices (e.g. other mobile electronic devices or audio peripherals, such as headsets and speakers). As used herein, the term "audio receiver device" is intended to indicate any device operable to receive audio signals, whether analog or digital. The smartphone 604 may include one or more of the electronic components described above with reference to FIGS. 4 and 5. For example, in one embodiment, the smartphone 604 may include a user input interface (e.g. touchscreen), a network interface including a cellular network interface, memory, a processor, a display, audio input/output structures, a location detection device (e.g. GPS receiver/transmitter), and one or more sensors (e.g. accelerometer).

The speaker 606 may function to convert an audio analog or digital audio signal into corresponding sound waves. The speaker 606 may be any type of speaker or speaker component, including wired or wireless speakers, computer speakers, portable speakers, floorstanding speakers, a speaker and subwoofer speaker system, stereo speakers, a surround sound speaker system, and the like. In one embodiment, the speaker 606 may include an analog audio port 616 operable to input and/or output analog audio signals. In a further embodiment, the speaker 606 may include an amplifier that amplifies the analog signals to produce amplified sound waves. In another embodiment, the speaker 606 may include a digital input port operable to receive digital audio signals from a peripheral device. In a further embodiment, the speaker 606 may also include a DAC operable to convert the digital audio signals into an analog signal that is used by the speaker 606 to generate sound waves. In one embodiment, the speaker 606 may include a data input/output port, such as, for example, a USB port. In another embodiment, the speaker 606 may include a wireless network interface, such as a Wi-fi network or a Bluetooth network interface so as to be able to connect to other devices wirelessly. In yet a further embodiment, the Wi-fi network may be operable to connect to the music sharing server system 612 wirelessly via the Internet 614. The speaker 606 is shown coupled to the wireless plug-in repeater 100b. In one embodiment, the wireless plug-in repeater 100b may be plugged into the analog audio port 616 associated with the speaker 606 for receiving from and/or transmitting audio signals to the speaker 606.

In one embodiment, the speaker 606 transmits analog audio signals through the analog audio port 616 to the wireless plug-in repeater 100b via the audio plug 106 (FIG. 1) for synchronously sharing the audio content broadcast from the speaker 606 to remote audio receiver devices on the network 600. In a further embodiment, the speaker 606 is a speaker system at a music concert and the wireless plug-in repeater 100b may be plugged into the analog audio port 616 on the speaker 606 during the concert so as to synchronously share the music content from the concert with remote audio receiver devices (e.g. PC, smartphone, headset, speaker, etc.). These audio receiver devices may be associated with individuals not physically present at the concert. In yet a further embodiment, the wireless plug-in repeater 100b transmits the music content from the concert in real-time to the music sharing server system 612 over the Internet 614 and the music sharing server system 612 determines what remote audio receiver devices to synchronously share the music content with. In a further embodiment, individuals associated with the remote audio receiver devices are required to provide payment to the music sharing server system 612, or a third-party payment service, in order to receive permissions to synchronously listen to the music content from the concert in real-time, as the concert is taking place.

It is understood that in any communications over a network there may be a propagation delay that represents the amount of time it takes for a signal to travel from a sender to a receiver over the network. In one embodiment, the music sharing server system 612 may permit a propagation delay between the audio content broadcast from the speaker 606 at the music concert (or other audio output device) and the audio content delivered to each of the remote audio receiver devices. Some amount of propagation delay and/or data processing latency (e.g., the music sharing server system 612 identifying music content, verifying permissions to music content, and implementing security protocols, etc.) may be acceptable in some embodiments. For example, in some embodiments, the amount of propagation delay may not be discernable by the human ear. In another embodiment, the amount of propagation delay may be discernable by the human ear, but may be sufficiently minimal so as to be considered acceptable. In another embodiment, the music sharing server system 612 may implement one or more techniques to reduce propagation delay from the original source of the music content to each remote audio receiver device on the network 600. In another embodiment, the music sharing server system 612 may implement one or more techniques to reduce propagation delay, as a result of the propagation delay exceeding a predetermined propagation delay threshold (e.g., 300 ms). As an example, in one embodiment, the music sharing server system 612 may ping each remote audio receiver device and determine an amount of time it takes for each remote audio receiver device to respond to the ping. The amount of time may be considered to represent a delay time associated with the audio receiver device, which may be unique for each remote audio receiver device. Accordingly, the music sharing server system 612 may offset transmission of the audio content according to each estimated delay time so that receipt of the audio content by each of the audio receiver devices may be substantially synchronous with one another. In other embodiments, other propagation delay reduction techniques may be implemented.

In one embodiment, the speaker 606 may operate as an audio receiver device, rather than an audio output device, as described above. The speaker 606 may receive audio signals from the wireless plug-in repeater 100b, which the speaker 606 uses to produce corresponding sound waves. Stated another way, a remote device communicatively coupled to the Internet 614 may synchronously share audio content with the speaker 606. In one example, the remote device is a smartphone, or other audio output device, that communicates music content over the Internet 614, via, for example, a Wi-fi network, to the music sharing server system 612. The music sharing server system 612 may subsequently, in real-time, transmit the music content to the speaker 606 so as to substantially synchronously share the music content with the speaker 606. As used herein, the term "substantially synchronous" is intended to indicate communicating a continuous time-based communication (e.g., a communication representing a musical composition) from a sender to at least two recipients with minimal delay. It is contemplated that any communications between a sender and remote recipients will likely have some degree of delay so to not be absolutely or perfectly synchronous. Accordingly, use of the term "synchronous" herein is intended to mean "substantially synchronous," whether or not the term "substantially" is explicitly used.

The headset 608 can be considered an audio receiver device and may function to convert audio analog or digital signals to corresponding sound waves directed toward a user's ear canal. The headset 608 may also be referred to as "headphones." The headset 608 may be formed as in-the-ear headphones (e.g., ear buds), on-the-ear headphones, around-the-ear headphones, or any other type of headphone, and may or may not include a microphone. In one embodiment, the headset 608 may be a wired headset, such as, for example, a USB headset. In an alternative embodiment, the headset 608 may be a wireless headset, such as, for example, a Bluetooth headset. In one embodiment, the headset 608 may include a DAC operable to convert digital audio signals to analog audio signals that can be utilized by the headset 608 to produce sound waves. In one embodiment, the headset 608 may be communicatively coupled to a Wi-fi network interface for receiving audio signals over the network 600 during a substantially synchronous music session in accordance with the present invention. For example, in one embodiment, the speaker 606 at the concert may output audio signals to the wireless plug-in repeater 100b. Subsequently, the wireless plug-in repeater 100b may communicate the audio signals to the music sharing server system 612. As a result, the music sharing server system 612 may verify that the headset 608 has permission to listen to the audio content from the concert and the music sharing server system 612 may send the audio content to the headset 608 via the Internet 614.

The user computer 610 may function as an initial registration device for registering the wireless plug-in repeater 100 with the music sharing server system 612. The user computer 610 may be a PC, a computer tablet, or other computing device. In one embodiment, the wireless plug-in repeater 100 may store a unique key or alphanumeric code in non-transitory memory. Initial registration may include connecting the wireless plug-in repeater 100 to the user computer 610 so that the unique key can be communicated to the music sharing server system 612 for matching the unique key with a list of authentic repeaters 100 and verifying that the unique key is associated with a unique and authentic wireless plug-in repeater 100. Many users store all or most of their music files on a PC because PCs typically have a relatively large memory capacity, as compared to smaller portable computing devices. Accordingly, in one embodiment, initial registration may include copying music files from the user computer 610 (e.g., a PC) to the music sharing server system 612.

Advantageously, in some embodiments, music files that the user is listening to may be synchronously shared by obtaining the music files directly from the music sharing server system 612. In this embodiment, timing information (e.g., bit number of the song) identifying at what position in the song the user is currently listening to may be communicated to the music sharing server system 612 so that the music sharing server system 612 can begin transmitting the song synchronously to remote audio receiver devices from the same place in the song that the user is currently listening to. For example, a song may be stored as a digital file representing 3 megabits of audio digital data with each bit representing a portion of the song. The user may begin synchronously sharing the song at bit one-million. Accordingly, the wireless plug-in repeater 100 may send to the music sharing server system 612 data identifying bit one-million including data identifying the song and at least one selected audio receiver device. As a result, the music sharing server system 612 may locate the song in a database coupled to the music sharing server system 612 and stream the song beginning at bit one-million of the song to the selected audio receiver device(s). In a further embodiment, the music sharing server system 612 may attempt to account for propagation delay by first pinging the audio receiver device (s). If, for example, an audio receiver device takes 600 milliseconds (ms) to respond to the ping, the music sharing server system 612 may begin transmitting the song to said audio receiver device at bit one-million plus the number of bits equivalent to a 600 ms delay in order to more closely produce substantially synchronous sharing of the song over the network 600.

In another embodiment, instead of the wireless plug-in repeater 100 identifying a position in the song and sending an identification of said position to the music sharing server system 612, the music sharing server system 612 may be responsible for identifying what position in the song the user is currently listening to. For example, the music sharing server system 612 may detect a song associated with the music content that is received, detect where in the song the music content is at, identify a copy of the song stored on a database associated with the music sharing server system 612, and retransmit the music content from the stored copy of the song at the detected time or position in the song. In a further embodiment, the copy of the song is stored as a digital file on the database. In another embodiment, the detected time or position in the song is represented as a timestamp. The timestamp may be considered information identifying the position in the song. In yet another embodiment, detection of the song associated with the music content may be performed by, for example, the music sharing server system 612 comparing the music content to a database of songs to identify a song matching the music content.

Still referring to FIG. 6, the music sharing server system 612 may function as a centralized hub to route, manage, process, and coordinate substantially synchronous sharing of music content across the network 600 in accordance with the present invention. The music sharing server system 612 may include any combination of software applications and/or hardware components for establishing a music sharing and social network-based platform for users. In one embodiment, the music sharing server system 612 is formed as a single server computer. In another embodiment, the music sharing server system 612 includes more than one server computers communicatively coupled to one another across the network 600 (e.g., a cloud computing system). The music sharing server system 612 may include one or more databases for storing music content and associated user permissions, user profile information, audio receiver device information, and the like. The music sharing server system 612 may facilitate interaction and communication among users of client devices (e.g., wireless plug-in repeaters 100a-n, speakers 606a-n, headsets 608a-n, etc.), or with other related applications and/or systems via the network 600. For example, the music sharing server system 612 may provide a platform for users of the client devices who are also members of the social network to, for example, view and access audio receiver devices of other users of client devices who are also members of the same social network for initiating and/or accepting synchronous music sharing sessions with one another. As another example, the music sharing server system 612 may provide a platform for users of the client devices who are also members of the social network to, for example, view and access all or a portion of the music content and music files associated with the user, such as, the music files stored at the music sharing server system 612 associated with the user, and playlists and radio stations associated with third-party music services (e.g., iTunes, Spotify, Pandora, etc.) that the user has an account with. Advantageously, embodiments of the present invention can provide a centralized music depository for music content aggregated from a plurality of third-party music services through a single platform. In one embodiment, the music sharing server system 612 may allow users of the social network to view music content (e.g., name of song, album, artist, category, etc.) that other users designated as friends within the social network are currently listening to on their client devices. Accordingly, users can stay informed about what type of music content their friends are currently listening to and may request synchronous sharing sessions with their friends, if, for example, the song is unfamiliar or otherwise catches the user's interest.

Figure 7A:
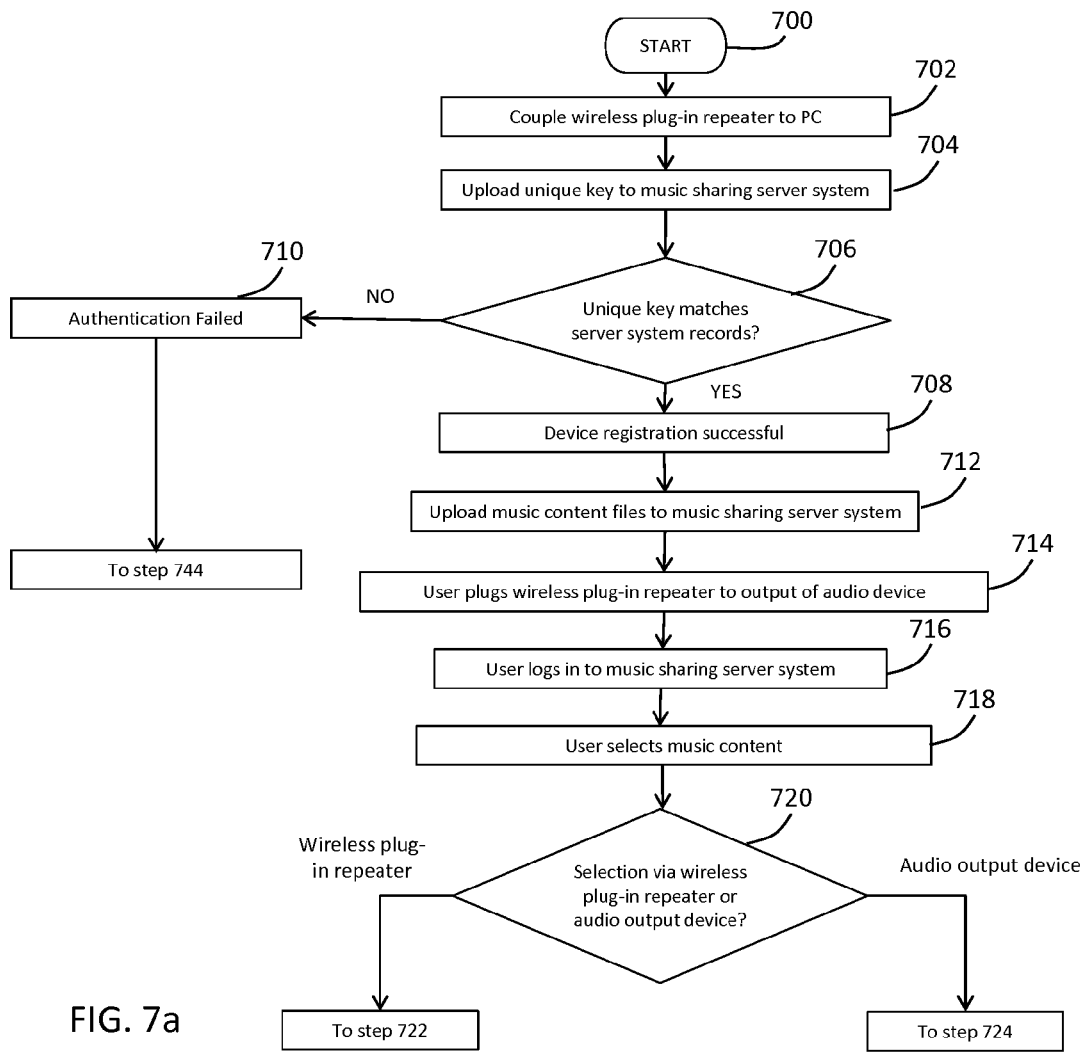
FIG. 7a is a process flow chart representing an exemplary method of using the wireless plug-in repeater over a network in accordance with the present invention.
Figure 7B:
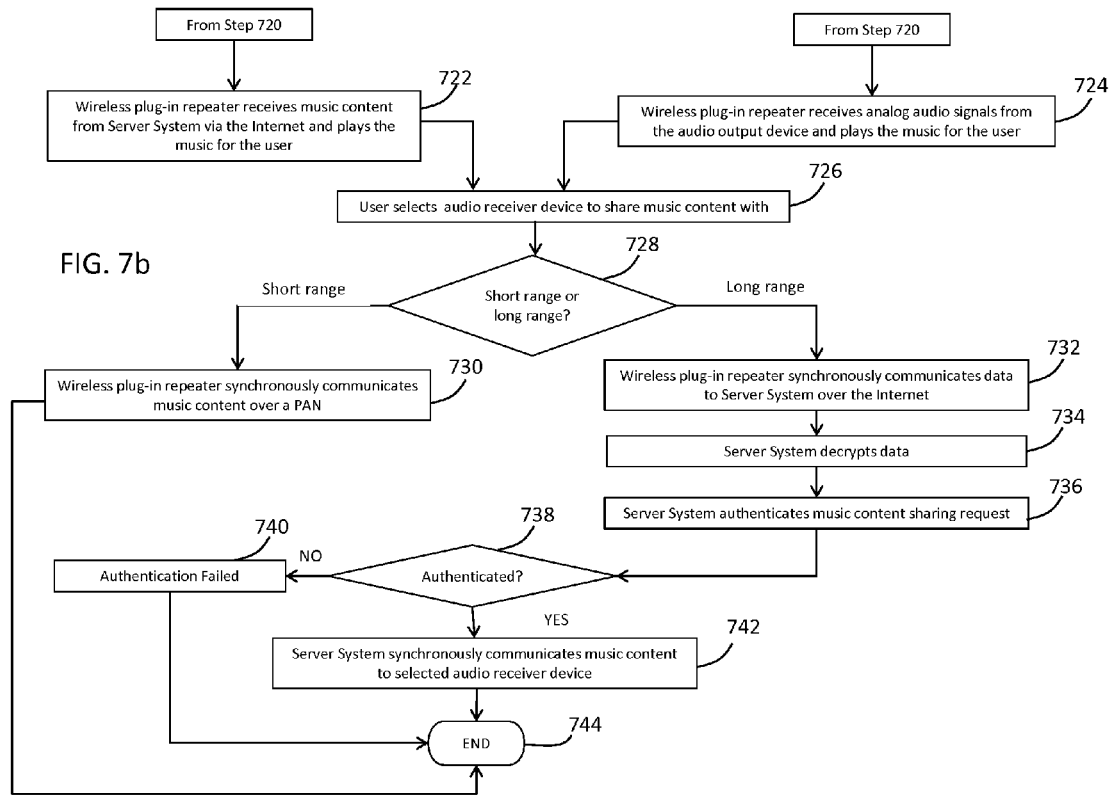
FIG. 7b is a continuation flow chart of the exemplary process shown in FIG. 7a, in accordance with the present invention.

FIGS. 7a-b illustrate an exemplary process for using the wireless plug-in repeater 100 in accordance with an embodiment of the present invention. Although FIGS. 7a-b show a specific order of executing the process steps, the order of executing the steps may be changed relative to the order shown in certain embodiments. Also, two or more steps shown in succession may be executed concurrently or with partial concurrence in some embodiments. Certain steps may also be omitted in FIGS. 7a-b for the sake of brevity. In some embodiments, some or all of the steps included in FIGS. 7a-b can be combined into a single step.

The process flowchart of FIGS. 7a-b will be described in conjunction with FIGS. 4 and 6. The process of FIGS. 7a-b begins at step 700 and moves directly to step 702, where the user couples the wireless plug-in repeater 100 to an initial registration computing device, such as the user computer 610 (e.g., a PC). In one embodiment, the coupling is a wired USB cable connection between the USB port on the wireless plug-in repeater 100 and a USB port on the user computer 610. In another embodiment, the coupling is a wireless connection via a Bluetooth network established between the user computer 610 and the wireless plug-in repeater 100. In a further embodiment, the user computer 610 may be required to pair with the wireless plug-in repeater 100 prior to establishing the Bluetooth network. In one embodiment, a unique key associated with the wireless plug-in repeater 100 is stored in non-volatile memory 404. During the initial registration phase, the unique key may be retrieved from the memory 404 by the processor 402 and, in step 704, uploaded to the music sharing server system 612 over the network 600.

In some embodiments, registration of the wireless plug-in repeater 100 with the music sharing server system 612 may be required to identify unique active wireless plug-in repeaters 100a-n associated with a user or a user account and/or to verify that the unique active wireless plug-in repeater 100a-n is an authentic device, rather than, for example, an illegal copy. In one embodiment, the music sharing server system 612 stores the unique key for each known valid wireless plug-in repeater 100a-n, which it compares to keys that it receives from repeaters 100a-n that request an initial registration. As used herein, the term "key" is intended to indicate a unique alphanumeric code or any other security feature that may be used to uniquely identify a wireless plug-in repeater to the music sharing server system 612.

In step 706, the music sharing server system 612 determines whether the received key matches the any unique keys stored on the server system 612 or a database associated with the server system 612. If the received key matches a unique key stored at the music sharing server system 612 or a database associated with the music sharing server system 612 and the wireless plug-in repeater 100 associated with said unique key has not yet been registered, the music sharing server system 612 may authentic the wireless plug-in repeater 100 and allow it to be registered, in step 708. If the received key does not match a unique key stored at the music sharing server system 612 or an associated database, or if the wireless plug-in repeater 100 associated with the received key has already been registered, the music sharing server system 612 may not allow registration, in step 710. Instead, the server system 612 may send an "authentication failed" message to the requesting wireless plug-in repeater 100 and the process proceeds to step 744, where the process ends.

In step 708, device registration may include the music sharing server system 612 downloading a software application, executable, or other computer instructions to assist the user computer 610 with registering the wireless plug-in repeater 100 and the user. In one embodiment, registration may include guiding the user in creating a user account and/or associating the user account with the wireless plug-in repeater 100. In a further embodiment, the user account may include a user profile with identification and contact information associated with the user. In a further embodiment, the user may be prompted to create a unique user name and password to be associated with the user account. In yet a further embodiment, the user may be able to search, request, and/or add friends to his account. The user may be able to establish settings for permissions associated with said friends. For example, the user may be to allow friends to view audio receiver devices associated with the user's account, select one or more of the audio receives devices, and establish a synchronous music content sharing session with the selected audio receiver devices. In another embodiment, the user may be able to register audio receiver devices with the server system 612 and associate the registered audio receiver devices with the user's account. In yet another embodiment, the user may be able to associate the user's account with one or more third-party accounts for third-party music services, such as, for example, iTunes, Spotify, Pandora, and the like. Advantageously, this may allow the user to access music content from a plurality of third-party music services via one platform, or portal.

From step 708, the process transitions to step 712, where music content files are uploaded to the music sharing server system 612. The music content files may be in any audio file format, such as, for example, MP3, WAV, AIFF, AAC, and the like. In one embodiment, the music content files may be stored on the user computer 610 and accordingly uploaded from the user computer 610 to the server system 612. For example, the music content files may be music files associated with the user's iTunes account, which are typically stored on the user computer 610. As another example, the music content files may be personal music content files, not associated with any music service, such as, for example, musical compositions personally created and/or recorded by the user, or music content files purchased by the user independent of a third-party music service. In another embodiment, the music content files are uploaded to the music sharing server system 612 from a database associated with a third party service, rather than directly from the user computer 610.

After the user completes the registration process, the user may uncouple the wireless plug-in repeater 100 from the user computer 610 and begin normal use. In step 714, the user may couple the wireless plug-in repeater 100 with any audio output device, such as, for example, the mobile electronic device 604, the speaker 606, the headset 608, or any other audio output device operable to output an analog audio signal. For clarity and convenience, the process will be described with reference to the mobile electronic device 604 as the exemplary audio output device; however, it is understood that any audio output device may be connected to the wireless plug-in repeater 100 and that once the analog audio signal is output from the audio output device to the repeater 100, the process may proceed in a similar manner in accordance with embodiments of the present invention. In one embodiment, the user may couple the wireless plug-in repeater 100 to the mobile electronic device 604 by inserting the audio plug 106 into the audio output port 200 (FIG. 2) of the electronic mobile device 604. In another embodiment, the user may couple the wireless plug-in repeater 100 to the mobile electronic device 604 through another wired or wireless connection.

In step 716, the user may log-in to the music sharing server system 612 through a network, such as the Internet 614. In one embodiment, the wireless plug-in repeater 100 may include a software application that the user can interface with via the display 406 and the user input interface 408 of the repeater 100. The software application may provide a user interface displayable on the display 406 that the user can utilize to log-in and otherwise interact with the music sharing server system 612. In one embodiment, the software application may be provided as an app, which is a software application specialized for mobile computing devices (e.g., smartphone, tablet, etc.). In another embodiment, the software application may be provided as one or more web pages within a browser. Web pages are well known in the art and are a resource of information that is suitable for access over the Internet 614 and can be accessed through a web browser running on a computing system, such the wireless plug-in repeater 100. In yet another embodiment, the software application may be implemented as other types of software applications or computer programs. In one embodiment, the user may install and launch the software application on the wireless plug-in repeater 100 that facilitates the log-in with the music sharing server system 612. The user may then use the wireless plug-in repeater 100 to upload a user-identifier with the music sharing server system 612. This user-identifier may include a unique log-in user name or password. This may also include user-identifying information such the user's address, phone number, a photo of the user, biometric data, e.g., retinal/facial scan and fingerprints, and other user-identifying information. As a result of the user providing at least one piece of user-identifying information, the user may be able to access the user account on the music sharing server system 612.

In one embodiment, as part of the log-in process, the wireless plug-in repeater 100 may upload the unique key to the music sharing server system 612. The unique key may be stored in memory 404 on the wireless plug-in repeater 100. The server system 612 may maintain a list of unique keys that are associated with authentic registered wireless plug-in repeaters 100. In another embodiment, this list may also be stored in a database associated with the server system 612. The server system 612 may verify that the unique key uploaded by the wireless plug-in repeater 100 matches a unique key in the list, prior to providing the wireless plug-in repeater 100 with access to the user's account on the music sharing server system 612. In one embodiment, as a result of the user gaining access to the user's account, the user may be able to view all of the playlists, stations, and other music content files associated with the music sharing server system 612, which may include playlists, stations, and music content files associated with third-party music services through the user's third-party music service accounts. These music content files, playlists, and stations may be displayed via the software application interface, as discussed above, with reference to the log-in process in step 716. In another embodiment, the user may also be able to view audio receiver devices associated with the user's account and/or audio receiver devices associated with a friend's user account. In yet another embodiment, the user's "view" of the audio receiver devices may include an icon or other computer displayable indicator along with an identifying name or code associated with the audio receiver device, such as, for example, "My headset" and "Elizabeth's speaker." In a further embodiment, all audio receiver devices that are viewable and accessible via access to the music sharing server system 612 should first be registered with and authenticated by the music sharing server system 612, as discussed herein above.

In step 718, the user may select music content to be played for the user. In one embodiment, the user may select music content via the mobile electronic device 604, or other audio output device (e.g., speaker or headset). For example, the user may launch a third-party app, such as, for example, Pandora and allow a Pandora radio station to play music on the mobile electronic device 604. As another example, the user may select music files stored on the mobile electronic device 604. In one embodiment, the music content on the mobile electronic device 604 may be converted by a DAC on the mobile electronic device 604 into an analog audio signal. The analog audio signal can then be output via the audio output port 200 (FIG. 2) of the mobile electronic device 604. Accordingly, the music content can be communicated from the mobile electronic device 604 to the wireless plug-in repeater 100 from the audio output port 200 (FIG. 2) of the mobile electronic device 604 to the audio plug 106 of the repeater 100.

In an embodiment where the audio output device is the speaker 606, the user's selection of music content may be whatever audio signals are received into the speaker 606 for producing sound waves. Such audio signals may then be communicated from the speaker 606 to the wireless plug-in repeater 100 via an audio output port of the speaker 606. Likewise, in an embodiment where the audio output device is the headset 608, the user's selection of music content is whatever audio signals are received into the headset 608 for producing sound waves for the user. Such audio signals may be communicated to the wireless plug-in repeater 100 in a manner similar to the speaker 606, i.e., output via an audio output port associated with the headset 608. The audio signals may be digital or analog. If, for example, the headset 608 receives digital audio signals, the headset may include a DAC that converts the digital audio signals into analog audio signals that may then be output via the audio output port and transmitted to the audio plug 106 of the wireless plug-in repeater 100. In one embodiment, the headset 608 may only be operable as an audio receiver device and not as an audio output device.

In another embodiment, the user may select music content to be played for the user via the software application on the wireless plug-in repeater 100. For example, the software application may provide a playlist or other representation of the user's available music content through the music sharing server system 612. The user may then select a song displayed on the display 406 of the wireless plug-in repeater 100 by, for example, clicking on or touching a computer displayable icon, button, or link associated with the song.

In step 720, the process determines whether the user-selected music content was selected through the software application on the wireless plug-in repeater 100, or whether the user-selected music content is from an analog audio signal received through the audio output device plugged-in to the repeater 100, such as the mobile electronic device 604.

If the user-selected music content was selected through the software application on the wireless plug-in repeater 100, the process proceeds to step 722, where the wireless plug-in repeater 100 receives music content from the music sharing server system 612 and plays the music for the user. The music content may be retrieved from the server system 612 over the Internet 614 using the wireless network interface 400 and then played on the wireless plug-in repeater 100 through, for example, the speaker 412, or a headset connected to the USB port 414. In one embodiment, the music content may be received via the wireless network interface 400 as digital data, which may then be converted by the DAC 418 into analog data that is amplified by the amp 410 and output as sound waves to the user via the speaker 412. In another embodiment, the music content may be received via the wireless network interface 400 as digital data, which may then be output as digital data via the USB port 414, where the headset connected to the USB port may include a DAC that converts the digital data into analog data that can be used by the headset to produce sound waves for the user. Communications with the music sharing server system 612 may be implemented via the Wi-fi interface of the wireless network interface 400. Unfortunately, Wi-fi is considered to be less secure than some other wireless and wired networks. Accordingly, in one embodiment, at least a portion of the communications to the music sharing server system 612 are encrypted by the encryption module 420 and at least a portion of the communications received from the music sharing server system 612 are decrypted by the encryption module 420 in order to be utilized by the wireless plug-in repeater 100. In a preferred embodiment, all communications to the music sharing server system 612 are encrypted by the encryption module 420 and all communications received from the music sharing server system 612 are decrypted by the encryption module 420 in order to be utilized by the wireless plug-in repeater 100.

If, on the other hand, the user-selected music content is received from the audio output device plugged-in to the wireless plug-in repeater 100, the process proceeds to step 724, where the wireless plug-in repeater 100 receives analog audio signals from the audio output device, such as the mobile electronic device 604, and plays the audio signal for the user. In one embodiment, the analog audio signals are received via the audio plug 106. The analog audio signals may be amplified by the amp 410 and used by the speaker 412 to produce sound waves for the user. In another embodiment, the analog audio signals are converted by the ADC 418 into digital audio signals, which may then be output as digital audio data via the USB port 414, which may be connected to a USB headset capable of producing sound waves for the user. The present invention envisions that synchronous sharing of music content begins, first with the user playing the music content for himself. Once this step is initiated, the user may synchronously share the music content that he listening to with other people, even other people who are very far away.

In step 726, the user may synchronously share music content by selecting one or more audio receiver devices. In one embodiment, the user may select an audio receiver device via the software application on the wireless plug-in repeater 100, by, for example, clicking on the icon or another computer displayable feature associated with the audio receiver device. In another embodiment, the user may select an audio receiver device by tapping on a touchscreen associated with the display 406 of the wireless plug-in repeater 100. In yet another embodiment, the user may select an audio receiver device through a voice-activated command feature. In a further embodiment, the user may select an audio receiver device through a list of Bluetooth-enabled audio receiver devices that are paired with the wireless plug-in repeater 100.

In one embodiment, the user's selection may be communicated to the music sharing server system 612 over the Internet 614. In another embodiment, the server system 612 may automatically initiate a process for synchronously sharing music content with the selected audio receiver device. In yet another embodiment, the server system 612 may first request permission from the user associated with the selected audio receiver device to receive the music content. The server system 612 may not share music content with the selected audio receiver device until its user accepts the request. In a further embodiment, the server system 612 may send a ping to the audio receiver device over the Internet 614 to determine that the audio receiver device is awake (e.g., power on) and/or for estimating a propagation delay time associated with the audio receiver device.

In step 728, the process may determine whether the selected audio receiver device is within a short range from the wireless plug-in repeater 100 or within a long range from the wireless plug-in repeater 100. If the wireless plug-in repeater 100 is within a short distance from the selected audio receiver device, the process proceeds to step 730, where the wireless plug-in repeater 100 synchronously shares the music content over a short range communications network, such as a PAN. In one embodiment, the PAN may be a Bluetooth network. In another embodiment, the PAN may be an ad hoc Wi-fi network. Propagation delay for communicating the music content over such short distances should be very minimal and may not be discernable to the human ear. Therefore, in one embodiment, propagation delay techniques may not be employed for short range communications. In another embodiment, propagation delay techniques are employed for short range communications. In one embodiment, synchronous sharing of music content with the selected audio receiver device over the PAN may include the wireless plug-in repeater 100 making a copy of the analog audio signal as it is being received via the audio plug 106, the ADC 418 converting the analog audio signal to a digital audio signal, and the wireless network interface 400 transmitting the digital audio signal to the selected audio receiver device over the PAN. This process may be repeated in a continuous manner until, for example, the song is complete or the music content is otherwise interrupted, because the analog audio signals are continuously received via the audio plug 106 as a continuous stream of data. Music content quality may be a function of how quickly and efficiently the processor 402, the ADC 418, and the wireless network interface 400 are able to work together to communicate the analog audio signal from the audio plug 106 to the remote audio receiver device as the analog audio signal continues to stream into the wireless plug-in repeater 100.

If, on the other hand, the wireless plug-in repeater 100 is determined to be within a long range distance from the selected audio receiver device, the process proceeds to step 732, where the wireless plug-in repeater 100 communicates with the music sharing server system 612 over the Internet 614. In one embodiment, the wireless plug-in repeater 100 may consider "long range" communications to be greater than 10 feet. In another embodiment, long range communications may be greater than 20 feet. In yet another embodiment, long range communications may be any communications that exceed the available communications range for any short range communications networks that the wireless plug-in repeater 100 is capable of. In a further embodiment, long range communications may be outside of these ranges.

In one embodiment, the wireless plug-in repeater 100 communicates the music content to the music sharing server system 612 via the Wi-fi interface of the wireless network interface 400. The Wi-fi interface may access the Internet 614 through an access point, such as a Wi-fi router within range of the wireless plug-in repeater 100. In one embodiment, the analog audio signals received via the audio plug 106 are converted into digital audio signals by the ADC 418. In a preferred embodiment, the ADC 418 is operable to convert analog data to digital data at a rate of at least about 192 kHz in order to provide a high quality musical sound. A rate of 192 kHz produces sound quality that is about five times the resolution of a standard music compact disc (CD). The digital audio signals may then be encrypted by the encryption module 420. In one embodiment, the digital audio signals may be triple encrypted by the encryption module 420 for added security. The encryption module 420 may include hardware and/or software components that are operable to implement one or more encryption algorithms. In a preferred embodiment, the processor 402 is a relatively high-speed processor (e.g., 32 MHz processor) so as to be able to convert the analog data to digital data and perform the encryption algorithms quickly enough to continuously process the incoming stream of analog audio data from the audio plug 106, without sacrificing sound clarity and quality. In another embodiment, the ADC 418 and/or the encryption module 420 may be separate from the processor 402, rather than implemented on the processor 402. The encrypted digital audio signals may be communicated to the wireless network interface 400, which may use the Wi-fi interface to communicate the digital audio signals to the music sharing server system 612. The Wi-fi interface may access a Wi-fi router, which then communicates the digital audio signals over the Internet 614 to the music sharing server system 612.

In one embodiment, an identification of the selected audio receiver device and/or a request to share music with the selected audio receiver device is communicated to the server system 612, as well as, the digital audio signals. The identification of the selected audio receiver device and/or the request to share music may also be encrypted by the encryption module 420 prior to being sent over the Internet 614. In another embodiment, the identification of the selected audio receiver device may be the unique key associated with the audio receiver device. In yet another embodiment, an identification of the wireless plug-in repeater 100 and the user (or the user account) is also communicated to the server system 612. The identification of the wireless plug-in repeater 100 and the identification of the user may be encrypted by the encryption module 420 and transmitted to the server system 612 along with the digital audio signals and any other accompanying data. In one embodiment, the identification of the wireless plug-in repeater 100 may be the unique key associated with the repeater 100 and the identification of the user may be, for example, the username or other identifying information. In one embodiment, the music sharing server system 612 may receive the information communicated from the wireless plug-in repeater 100. In one embodiment, the information may include at least one or more of: the digital audio signals associated with a portion of the music content that the user is currently listening to; an identification of the selected audio receiver device; a request to synchronously share music with said audio receiver device; an identification of the wireless plug-in repeater 100 that is submitting the request; and an identification of the user or the user account associated with the wireless plug-in repeater 100. In another embodiment, the information may include additional data.

In one embodiment, the processor 402 may be configured to execute computer instructions that are able to identify music content associated with the digital audio signals. Said computer instructions may also be configured to identify or determine meta data or meta information associated with the music content, such as, for example, an artist's name, album name, track number, a position in the song that is associated with the current digital audio signals being sent, how the music content is formatted (e.g., mono or stereo, 24 bit or 64 bit, etc.), and the like. This meta data may also be communicated to the music sharing server system 612 with the digital audio signals. In one embodiment, the meta data may be used by the server system 612 to identify a digital copy of the song previously stored on the server system 612 and synchronously share the music content from the digital copy on the server system 612, rather than sending the audio signals originating from the audio plug 106. Of course, in an alternative embodiment, the server system 612 may synchronously share the music content with the selected audio receiver device by sending the audio signals originating from the audio plug 106. In this embodiment, meta data may not be required to identify the position in the song because the audio signals are already at the current position in the song. In other words, position information may only be required in an embodiment where the server system 612 elects to share the music content from a digital copy on the server system 612, because the server system 612 will need to identify where in the song the user is currently at and then begin sending the bits at that current position in the song. In step 734, the music sharing server system 612 decrypts the information received from the wireless plug-in repeater 100.

In step 736, the music sharing server system 612 authenticates the request to share the music content being played by the user with the selected audio receiver device. In one embodiment, the music sharing server system 612 determines whether the selected audio receiver device has permission to share music content with the user. This may include verifying that selected audio receiver device is an authentic device that has already been registered with the server system 612. The server system 612 may verify that the unique key matches a unique key stored in the server system 612. In another embodiment, the server system 612 may verify that that the user associated with the selected audio receiver device is friends with the user sending the request to share music content. In yet another embodiment, the server system 612 send a query to the user associated with the selected audio receiver device to verify that the user accepts the request to share music content. In one embodiment, the server system 612 may verify whether the wireless plug-in repeater 100 is an authentic device. This may include verifying that the wireless plug-in repeater 100 has already been registered with the server system 612. The server system 612 may verify that the unique key associated with the wireless plug-in repeater 100 matches a unique key stored in the server system 612. In another embodiment, the music sharing server system 612 may verify that the user who sent the request to share the music content has a valid and active user account with the music sharing server system 612. In yet another embodiment, the music sharing server system 612 may authenticate whether the user has permission to listen to the music content. The music sharing server system 612 may verify that the music content is stored on the server system 612 and that the user possesses a license or other legal permission to listen to the music content. Music content uploaded to the server system 612 during initial registration may also be stored with permission information. For example, music content uploaded from an iTunes account associated with the user may also be identified on the server system 612 as including a license that allows the user to listen to the music content. Accordingly, when the user requests to share the music content with a remote audio receiver device, the server system 612 may first verify that the user has a license to listen to the music content. In one embodiment, if the server system 612 is unable to verify that the user possesses license or other legal permissions to listen to the music content, the server system 612 may deny the user's request to share the music content with another user. One the other hand, if the server system 612 is able to verify that the user possesses a license or other legal permissions to listen to the music content, the server system 612 may accept the user's request to share the music content and may initiate a synchronous music sharing session with the selected audio receiver device.

In step 738, the process determines whether the request to share music content is authenticated. If the request is not authenticated, the process proceeds to step 740, where the authentication has failed. From step 740, the process proceeds to step 744, where the process ends. On the other hand, if the request is authenticated, the process proceeds to step 742, where the music sharing server system 612 synchronously communicates the music content to the selected audio receiver device over the network 600, as discussed herein. An exemplary process in accordance with the present invention is shown in FIGS. 7a-b. The process ends at step 744.

One embodiment of the present invention includes synchronous sharing of music content without the use of wireless plug-in repeaters 100. Said synchronous sharing of music content may also include a method of allowing a user to follow another user's media streaming so that the media streaming is synchronously streamed to the user's account and the accounts of the user's followers. This embodiment of the present invention results in a media distribution model that departs widely from traditional and existing static media distribution models.

Figure 8:
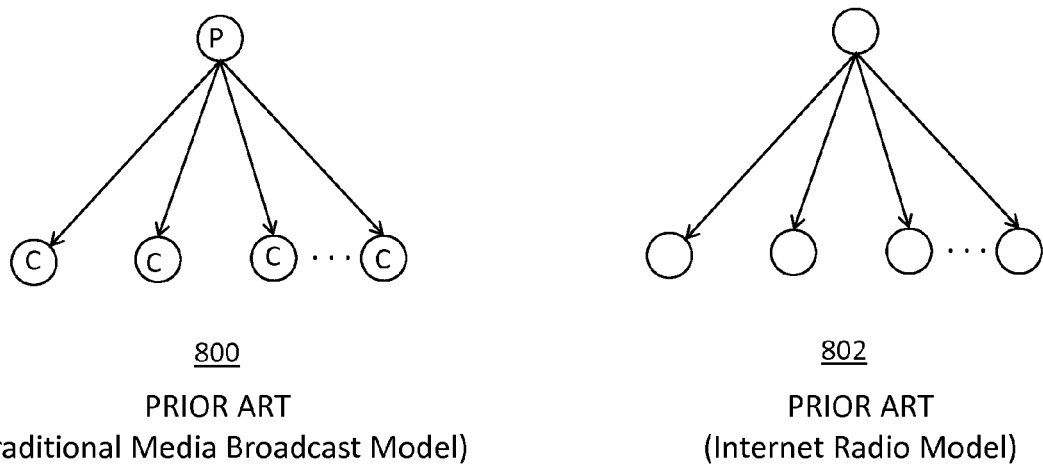
FIG. 8 is a schematic diagram of existing media distribution models.

FIG. 8 illustrates exemplary embodiments of existing distribution models 800 and 802 in schematic diagram views. The traditional media broadcast model 800 (e.g., FM/AM radio broadcasting and network television broadcasting) is shown in a hierarchal tree structure having a single parent node, P, at the first root level of the tree structure, with a plurality of child nodes, C, at the second level of the tree structure, subordinate to the parent node P. The parent node, P, can be seen as representing the broadcasting source or control (e.g., radio or television broadcast station) responsible for selecting and broadcasting content in a one-to-many traditional static broadcast model. The parent node, P, can be considered a singular master node that selects and controls content to be distributed to the child nodes in the second level. The child nodes, C, can be seen as slave nodes within the second level that are controlled by the parent node, P, in a two-level master-slave communication model, where the master, P, possesses unidirectional control over the slaves.

There are two features of the traditional broadcast model that are of note for the present purposes. First, this traditional broadcast model provides for only two hierarchy levels, where the master is on the first level and the children are on the second, subordinate level. In other words, this traditional model does not provide for more than two levels in the hierarchy, where, for example, a third level is controlled by the second level. Second, this traditional model is static. In other words, the traditional model does not allow for subtrees to be dynamically created and to break off from the original parent root node, P.

Although there have been many technological advances in media distribution with the advent of the Internet, this traditional two-level media broadcast model still dominates. For example, many current users listen to Internet radio 802, in which audio is transmitted via the Internet. Some Internet radio stations 802 may even provide individualized radio stations, where the content is selected by feedback from the listener. Yet and still, Internet radio 802 follows the traditional two-level broadcast model where a single parent node is the master and streams content to one or more listeners. Like traditional media broadcast stations, Internet radio 802 does not provide for more than two-levels in a hierarchy tree or the dynamic creation of subtrees that can break off into a completely separate listening tree, on-the-fly, in real-time.

In addition, the present invention is necessarily rooted in computer technology in order to overcome a problem specifically arising in the realm of computer networks. In particular, one of the problems that embodiments of the present invention solve is how to improve media sharing experiences by users over the Internet. Currently, synchronous media sharing between users over the Internet operates on the static two-level hierarchy model described above with a single master node controlling its slave nodes, as with Internet radio, for example. Additionally, some media sharing over the Internet can be considered non-synchronous in that users select their own content to listen to when they want to listen to it. Embodiments of the present invention are able to greatly improve media sharing experiences over the Internet by utilizing a central music server system that controls, processes, and securely routes transmissions for synchronous music sharing sessions between remote user devices over long distances via the Internet to ensure that the music is played synchronously on said remote user devices, with minimal latency; to ensure secure transmissions of proprietary media content over the Internet; and also to manage the legal permissions of digital content stored on the server's dataabase(s). It is well-known that the advent of the Internet created a huge new problem of Internet piracy, due, in part, to the ease with which electronic files can be copied and distributed over the Internet. Use of the music sharing server system addresses this Internet piracy problem, while also improving the media experience of users over the Internet. Embodiments of the present invention allow users to selectively synchronously follow content streamed to another user over the Internet, allowing the other user to become a master device selecting and controlling synchronous content for its followers. It is believed that providing this feature can greatly enhance the media sharing experience of users of the Internet.

Embodiments of the present invention provide for a multi-level, dynamic media distribution model. In other words, embodiments of the present invention provide for a media distribution system that broadcasts content over the Internet according to a multi-level hierarchy of content control and selection that may be dynamically created and altered by the system's end-users. Further, embodiments of the present invention allow an end-user to follow the content-streaming of another end-user, thereby promoting said another end-user to parent node/master node status and allowing said promoted end-user to select and control content streamed to followers through synchronous streaming of said content within his/her own account.

Figure 9:
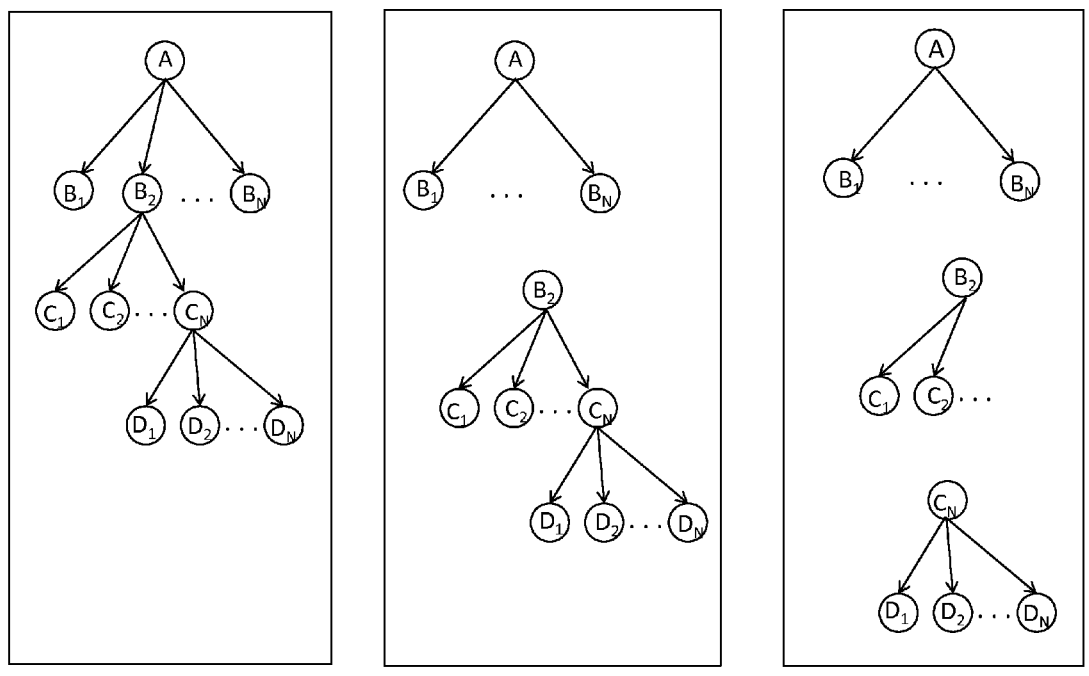
FIG. 9 is a schematic diagram of a dynamic media distribution model in accordance with an embodiment of the present invention.

FIG. 9 illustrates one exemplary implementation of a multi-level, dynamic media distribution model 900 in accordance with the present invention. In a first instance 902 of the model 900, node A can be considered the parent/master node responsible for selecting and controlling content. In one embodiment, node A can be, for example, a celebrity account, where nodes $B_1$ through $B_N$ are followers of node A and therefore child/slave nodes of the celebrity user account. This means that the media content that is streamed to the celebrity user account (node A) is also synchronously streamed to the user accounts associated with nodes $B_1$ through $B_N$, which are followers of the celebrity account (node A). Accordingly, user accounts that follow the celebrity account are able to synchronously receive streamed media content at the same time that said streamed media content is received by the celebrity account. This can give user fans the feeling that they are experiencing media simultaneously with the celebrity.

Within the multi-level tree structure of 902, nodes $C_1$ through $C_N$ are followers of node $B_2$ and nodes $D_1$ through $D_N$ are followers of node $C_N$. Accordingly, while nodes $B_2$ and $C_N$ are actively following node A, as in instance 902, all content streamed to node A are also simultaneously synchronously streamed to all of the child nodes in the subordinate hierarchy levels (nodes $B_1$-$B_N$ in the second level, nodes $C_1$-$C_N$ in the third level, and nodes $D_1$-$D_N$ in the fourth level).

Instance 904 demonstrates the resulting tree structure(s) as a result of the user account associated with node $B_2$ actively selecting to stream a content, different from the content streamed by the celebrity node A user account. This can be accomplished by the user associated with node $B_2$, for example, selecting to listen to a song stored within the user's account or, for example, selecting to listen to a radio station that is different from the radio station that the celebrity associated with node A is currently listening to, or, for example, initiating streaming of a television show, different from a television show the celebrity is currently streaming. One can image a multitude of actions that may be taken by the user associated with node $B_2$ to change the programming to content different than the content streamed to the celebrity, including simply turning the channel off. The resulting tree structure in instance 904 shows how an original multi-level tree structure, e.g., 902, can be dynamically altered by end-user $B_2$. End-user $B_2$ dynamically creates a second multi-level tree structure, where node $B_2$ is now the parent/master node, with nodes $C_1$-$C_N$, and $D_1$-$D_N$ being child/slave nodes of node $B_2$. Accordingly, while nodes A, $B_1$, and $B_3$-$B_N$ may continue receiving synchronous streaming of the content selected by node A, nodes $C_1$-$C_N$, and $D_1$-$D_N$ are now receiving synchronous streaming content selected by node $B_2$. The broadcast distribution structure controlled by the streaming content to node $B_2$ becomes completely independent of the content streamed to node A.

To follow with this example further, instance 906 demonstrates the resulting tree structure(s) as a result of the user account associated with node $C_N$ actively selecting to stream a content different from the content streamed by node B. The resulting structure in instance 906 is the dynamic creation of yet another independent tree, where node $C_N$ becomes the parent/master node with nodes $D_1$-$D_N$ becoming the child/slave nodes to node $C_N$. Accordingly, three distinct and independent tree structures can be created from an original multi-level hierarchal media distribution structure 902. This novel media distribution model allows end-users to have more control over media that is broadcast in a dynamic manner that is responsive, in real-time, to user selections, while also allowing users to synchronously receive media content with friends and followers over long distances, via the Internet. This novel media distribution model widely departs from the traditional media broadcast model associated with existing broadcast models 800 and 802. As used herein, the term "real-time" is intended to indicate a media distribution system that is subject to a "real-time constraint" of streaming copies of the same content to two or more network devices such that the content is substantially synchronously played on each of said two or more network devices.

Figure 10A:
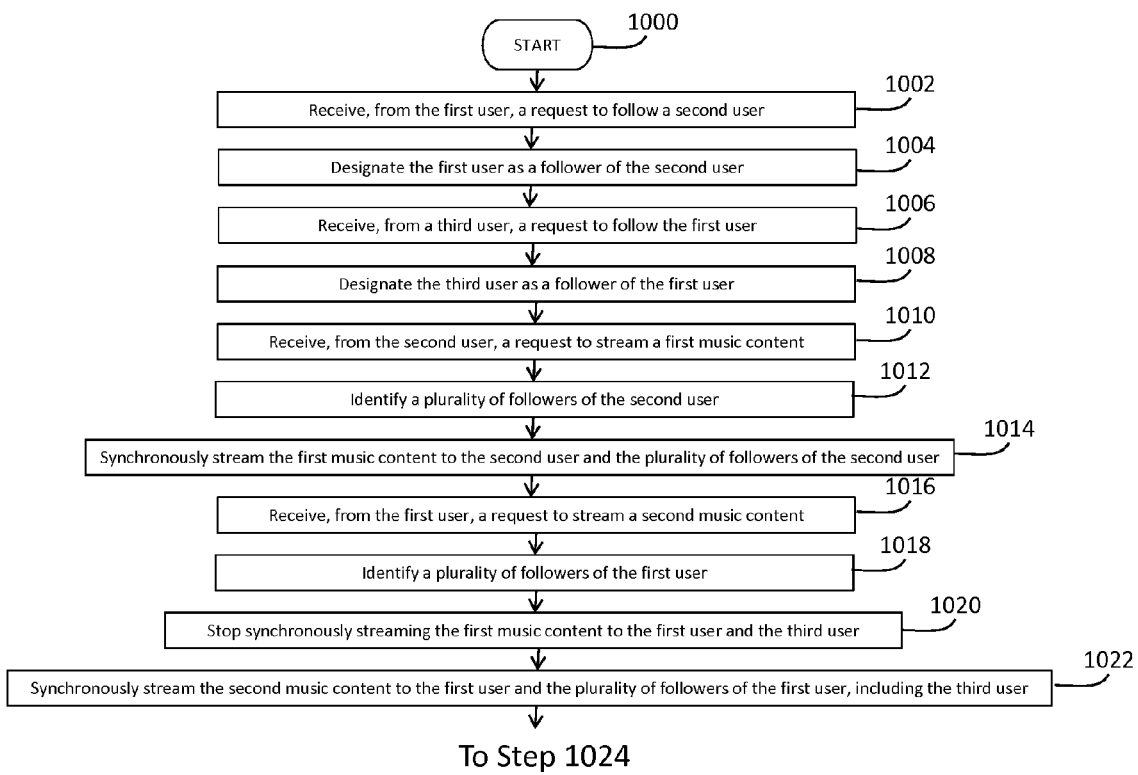
FIG. 10a is a process flow chart representing an exemplary method of synchronously streaming content to two or more client devices, in accordance with the present invention.
Figure 10B:
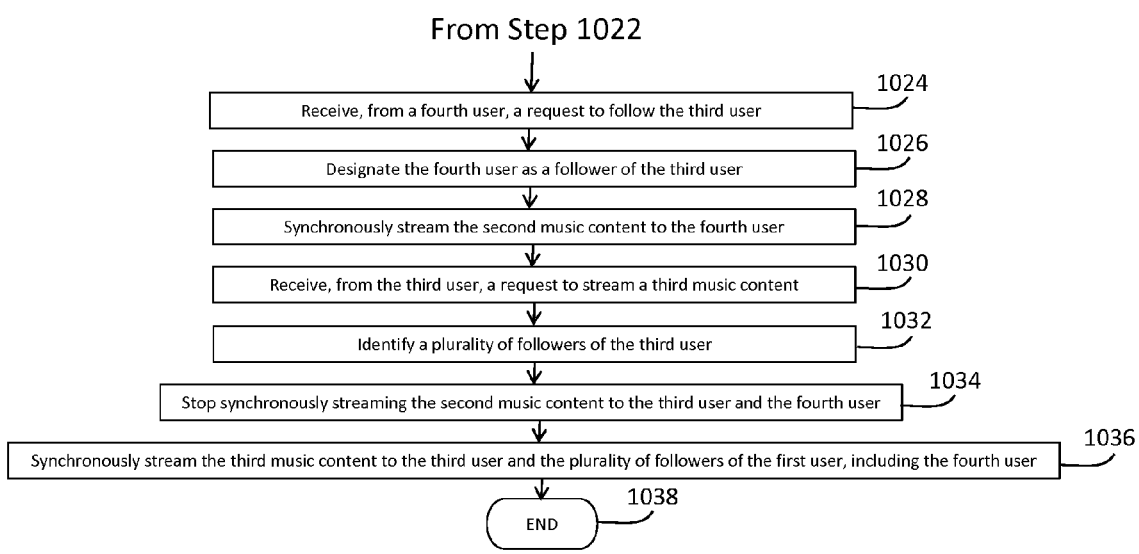
FIG. 10b is a continuation flow chart of the exemplary process shown in FIG. 10a, in accordance with the present invention.

FIGS. 10a-b illustrate an exemplary process for implementing a multi-level dynamic media broadcasting system in accordance with an embodiment of the present invention. Although FIGS. 10a-b show a specific order of executing the process steps, the order of executing the steps may be changed relative to the order shown in certain embodiments. Also, two or more steps shown in succession may be executed concurrently or with partial concurrence in some embodiments. Certain steps may also be omitted in FIGS. 10a-b for the sake of brevity. In some embodiments, some or all of the steps included in FIGS. 10a-b can be combined into a single step.

Figure 11:
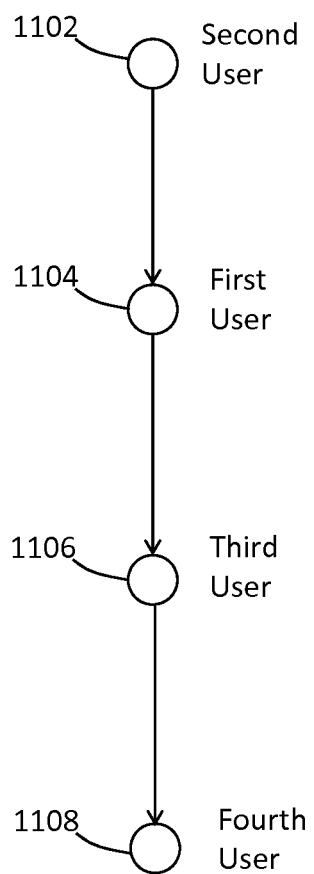
FIG. 11 is a schematic diagram of a multi-level hierarchical media distribution model, in accordance with an embodiment of the present invention.

The process flowchart of FIGS. 10a-b will be described in conjunction with FIG. 11. The process of FIGS. 10a-b begins at step 1000 and moves directly to step 1002, where a first user requests to follow a second user and, subsequently, to step 1004, the music server designates the first user as a follower of the second user. The term "user" as used herein with reference to FIGS. 10a-b is intended to indicate a user that possesses a user account associated with a music server, such as the music sharing server system 612 (see FIG. 6). The term "follow" is intended to indicate a user account configuration where a follower receives, from the music server, streaming of media content synchronously with the followee (i.e., the user being followed by the follower). The steps in the process described with reference to FIGS. 10a-b can be considered steps performed by the music server to implement an embodiment of the present invention. Other embodiments of the present invention can be considered process steps performed by a user, a computing device of a user, and/or a software application running on the computing device of the user.

The first user may request to follow the second user by, for example, selecting a button, icon, or other indicator selectable via a user web interface or app user interface associated with the first user's account. Selection of said indicator sends a request to the music server to designate and configure the first user's account to follow the second user, where following means that media content, such as, for example, audio content that is streamed to the second user is also streamed, synchronously to the first user. In one embodiment, the account of the first user is configured to automatically transmit to a computing device of the first user, a real-time copy of an audio stream transmitted to a computing device of the second user such that the audio stream and the real-time copy are played substantially synchronously on the computing devices of both the first user and the second user. In a further embodiment, said synchronous transmissions are over the Internet and the computing devices are communicatively coupled over the Internet. The term "automatically transmit" is intended to indicate that the copy of the second user's audio stream is synchronously transmitted to the first user without an express command from the first user to do so. For example, for as long as the first user is logged into his/her account and actively following the second user, the second user's audio stream is continuously copied and synchronously streamed to the first user, as well. Consequently, if the second user changes the audio stream by, for example, selecting a different radio station or playing a different song, the first user's account is automatically streamed whatever content the second user is listening to.

In one embodiment, the music server may also copy audio content that is locally stored on the second user's memory or storage, rather than the music server. For example, the music server may detect that the second user is playing a digital file stored on the second user's local memory. The music server may then copy the analog signal, convert it to digital data, and then retransmit the copied analog data to the first user's computing device over the Internet. Alternatively, other embodiments only provide for synchronous sharing between followers and followees of audio content stored on the database associated with the music server.

In order to ensure that the audio content is synchronously played on each computing device associated with a parent/master node and its followers, embodiments of the present invention perform time synchronization techniques. In one exemplary embodiment, the music server may initiate synchronization of audio content broadcast over the Internet by time-stamping (SP) a network packet that may be referred to herein as an initialization packet. Client computing devices may receive the initialization packet with the SP time-stamp, mark an arrival time (AT) of the packet, and estimate an amount of time that the client device may take to decipher the audio data (SM) and play it (e.g., 1.5 kilobytes of audio data). The audio data, SM, may be configured to be a standardized size for all streaming packets, such as 1.5 kilobytes. The time it takes to decipher and play the audio data may be referred to herein as the total-time-on-device (TOD). Subsequently, the client computing device may return a packet to the music server that contains the SP, AT, SM, and TOD. When the music server receives this packet from the client device, the music server may time-stamp the return time (RT) on the packet. The packet, including the SP, AT, SM, TOD, and RT may then be processed and analyzed by the music server in order to implement synchronous streaming to the client devices. In one embodiment, the following algorithm may be performed by the music server on the packet. With the information in the packet (SP, AT, SM, TOD, and RT), a processor associated with the music server may perform the following ordered steps:
  a) Calculate the timing cycle length (TCL) by determining the delta of SP and RT. The TCL can be considered the length of time between the music server sending the packet to the client device and the client device processing and returning the packet to the music server.
  b) Calculate the one-way travel time (TT) in, for example, milliseconds. TT=(TCL−TOD)/2. The TT can be considered an estimate of the travel time for communications over the network between the music server and the client device.
  c) Calculate the processing capability of the client device by SM/384000=BPM (bits per millisecond).
  d) The music server can next estimate that the network communications and device latency is: TT+bits sent*BPMs. This latency period can be considered a standard cycle (SC).

The music server may compare the SC for each client device associated with a synchronous streaming session and adjust the timing for sending each packet so that the audio content will be played simultaneously by each of said client devices. It is understood that each client computing device will likely have varying processing speeds and network transmission bandwidth capabilities. Accordingly, in order to ensure that audio content can be played synchronously on each device, embodiments of the present invention will determine the capability of the slowest of the client computing devices and modify the timing for sending each streaming packet to accommodate the slowest client computing device.

In one embodiment, the music server may repeat the above process of determining the SC for client devices every two (2) minutes. In a further embodiment, the music server may average all the data. In other embodiments, the music server may repeat the above process of determining the SC for client devices periodically every more than or less than two (2) minutes. The music server can be said to continuously monitor a latency period for each of the client computing devices and dynamically adjust a streaming speed to each of the computing devices based on the calculated latency periods. Stated another way, the music server repetitively calculates the latency period for the client computing devices and dynamically adjusts a timing for transmitting data packets associated with an audio stream to each of the computing devices so that the music content is played on each computing device synchronously. In yet a further embodiment, the music server allows for no more than a threshold delay of 20 milliseconds between substantially synchronous client computing devices. This threshold delay of 20 milliseconds can be generally considered the minimum delay necessary to perceive an echo, where, for example, client computing devices are within ear shot of one another.

In a further embodiment, the music server may continuously monitor the current position in the song or other content being streamed synchronously. The current position in a song may be identified by, for example, determining the bit position in a digital copy of a song. By identifying the position in the song and verifying the timing for sending each packet, the music server can transmit the packets so that the audio data will be played synchronously by each client device.

In step 1006, the music server may receive, from a third user, a request to follow the first user, and in step 1008, the music server designates the third user as a follower of the first user. Each of the first user, the second user, and the third user may have a user account with the music server. Each user account may be associated with a username and a password that provides the corresponding user with access to the music server and its streamed content. In one embodiment, users that request to follow another user may be automatically designated a follower by the music server. In another embodiment, users that request to follow another user may only be designated a follower if the requested user accepts the follower's request. In yet a further embodiment, users may be able to configure their accounts to either require authorization or to automatically accept follower requests. In yet a further embodiment, users may be able to configure their accounts to automatically accept follower requests of friends, but require express authorization for non-friends. Steps 1002 through 1008 may result in a three-level hierarchical distribution model 1100, where the second user 1102 is the parent/master node at the first level, the first user 1104 is a child/slave node of the second user 1102 at the second level, and the third user 1106 is a child/slave node of the first user 1104 at a third level, as depicted by the schematic diagram view of FIG. 11. As will become apparent in the remaining steps in the exemplary process, this novel media distribution model can be dynamically altered by end-users on-the-fly, in real-time by the music server.

In one embodiment, each user may be allowed to follow only one user for purposes of sharing a synchronous media streaming session. In direct contrast to text-based following, such as Twitter, it is not possible to follow multiple users at the same time with audio streaming because human beings can only practically listen to a single audio stream at a time, whereas multiple text communications can be transmitted almost instantly at the same time and may be displayed on a screen simultaneously with other text communications. In another embodiment, each user may be allowed to follow multiple users, but may be allowed to actively follow only one user at a time. In other words, embodiments of the present invention require that the user select only one other user account that may be considered its master, responsible for selecting and controlling the synchronous streaming for both accounts at any time. In yet a further embodiment, a user may have several sub-accounts, and each sub-account may be associated with a separate audio playback device. Accordingly, each sub-account associated with an audio playback device may follow a different user. For example, a user may have a sub-account for a work PC and another sub-account for a home audio system, where the work PC follows a user account associated with a conservative artist, while the home audio system follows a celebrity user account that typically plays more modern music selections.

In step 1010, the music server may receive a request from the second user 1102 to stream a first music content. In one embodiment, the second user 1102 may initiate the request by, for example, selecting a button, icon, or other indicator identifying the first music content, the indicator selectable via a user web interface or app user interface associated with the second user's account. Selection of said indicator identifying the first music content may cause a request to be transmitted to the music server to retrieve the first music content from the database associated with the music server and prepare to synchronously transmit the first music content to the computing devices of the second user and the second user's followers. The first music content may be a song or other audio file. In another embodiment, the first music content may also be accompanied by streaming video (e.g., a movie with video and audio).

In step 1012, as a result of the second user's request to stream the first music content, the music server may identify a plurality of followers of the second user. In the instant example, the first user is among the plurality of followers of the second user. The music server may store an identification of followers for each user account in a database communicatively coupled to the music server. The plurality of followers can be any number of followers. It is contemplated that some user accounts may have a large number of followers, for example, on the order of millions, while other user accounts may not have any followers, or may have only a single follower. It is also contemplated that in some embodiments followers are friends, while, in other embodiments, followers may be completely unrelated to the user account being followed. For example, celebrity accounts may have a large number of followers by users that are completely unrelated to the celebrity.

In step 1014, as a result of the second user's request to stream the first music content and the server's identification of the plurality of followers of the first user, the music server may synchronously stream the first music content to the computing devices of the second user and the plurality of followers of the second user, including the computing device of the first user and the third user. Synchronous streaming of the first music content to the first user occurs because the first user is a follower of the second user. Although the third user is not a follower of the second user, synchronous streaming of the first music content to the third user occurs because the third user is a follower of the first user, who is a follower of the second user.

In one embodiment, the step of synchronously streaming the first music content includes automatically streaming the first music content to the third user, without receiving a request from the third user to stream the second music content. Accordingly, the third user may receive streaming content at the direction and control of the second user, even though the third user is not a follower of, or even aware of, the second user, by virtue of the third user being a follower of the first user. It is contemplated that there may be a large number of levels that separate the user account selecting and controlling the synchronous streaming content from its slaves. In the instant example, there is one level separating the second user from the third user (see FIG. 11), with the first user being the connecting user. One can image if this example were expanded to include, for example, one hundred users separating the second user from the third user by virtue of a one-hundred level deep hierarchy of followers and followees. This exemplifies the multi-level hierarchical structure of the media distribution model of embodiments of the present invention, which widely departs from the two-level hierarchical structure 800 and 802 (see FIG. 3) of existing media distribution models. Embodiments of the present invention provide for a more organic media distribution model that allows end-users to dynamically control distribution on-the-fly, by selecting a user to follow and, alternatively, breaking off from a follower and selecting different content for the user's followers to experience.

In one embodiment, the first, second, and third users are remote from one another and communications with the music server are performed over the Internet. In a further embodiment, the first, second, and third users can be said to not be within the same local area network as one another. In other words, the computing devices of the first, second, and third users are disposed a distance from one another that exceeds a distance of a local area network. In yet a further embodiment, synchronous streaming with the ability to designate followers and to follow others may be implemented as a subscription-based model, where users pay a monthly or yearly subscription fee in order to access such features.

Some embodiments of the present invention provide for only unidirectional streaming of audio content, such as, for example, the music server streaming audio content to client devices (one-direction). In other embodiments, the music server may provide bi-directional streaming of audio content, such as, for example, allowing the followee to transmit, via the music server, microphone audio to followers. Accordingly, the person being followed can broadcast, for example, audio commentary to his/her followers. In one embodiment, the audio commentary may only be enabled for the followee/master-parent node so as not to crowd the broadcast channel with too many individual microphone audio streams. In yet a further embodiment, the music server may also provide a messaging network and interface, where text-based messages of followers may be posted while the music content is synchronously streamed. This can provide followers with a "voice" without crowding the audio stream with multiple microphone inputs.

In step 1016, while the music server continues to synchronously stream the first music content to the second user and the plurality of followers of the second user, the music server receives, from the first user, a request to stream a second music content. In one embodiment, the second music content is different from the first music content. For example, the first and second music content may be different songs or a different radio station. Alternatively, the first and second music content may, in fact, be the same song, but played at different times so as to be no longer considered synchronously communicated. This may occur, for example, where the first user likes the song associated with the first music content and decides to purchase said song, via, for example, a purchase hyperlink, in order to independently play (stream or download) the song on his computing device, without synchronously sharing it with the second user.

In step 1018, the music server identifies a plurality of followers of the first user as a result of the first user's request to stream the second music content. In the instant example, the third user is among the plurality of followers of the first user. In step 1020, independent of the synchronous streaming of the first music content to the second user, the music server may end the synchronous streaming of the first music content to the first user and the third user and, in step 1022, the music server may begin synchronously streaming the second music content to the first user and the plurality of followers of the first user, the third user among the plurality of followers of the first user.

The first user can be said to be the master/parent node, responsible for controlling the nodes of its followers/slave nodes. In one example, the first user may choose to stop receiving streamed content, which will automatically cause the music server to stop streaming content to the plurality of followers of the first user. Stated another way, as a result of a request by the first user to do so, the music server may stop the synchronous streaming of the second music content to the first user. As a result, the music server may automatically stop the synchronous streaming of the second audio content to the third user by virtue of the third user being a follower of the first user and without receiving a request from the third user to stop said synchronous streaming. Likewise, the first user's requests to change the audio content will result in the music server automatically changing the audio content streamed to the third user in order to continue the synchronous streaming session between the first and third user.

Continuing with the example, in step 1024, the music server may receive from a computing device of a fourth user 1108 a request to follow the third user 1106. In step 1026, as a result of the fourth user's request to follow the third user 1106, the music server may designate the fourth user 1108 as a follower of the third user 1106. In step 1028, the music server may automatically identify a position in the second music content that is being streamed to the third user 1106 and begin synchronously streaming, from that position, the second music content to the fourth user 1108. In step 1030, the music server may receive a request from the third user 1106 to stream a third music content. In one embodiment, the third music content may be different from the first music content and the second music content. In step 1032, the music server may identify a plurality of followers of the third user 1106 as a result of the third user's request to stream the third music content, with the fourth user 1108 being among the plurality of followers of the third user 1106. In step 1034, independent of the synchronous streaming of the first music content to the second user and the second music content to the first user, the music server may, in step 1034, stop the synchronous streaming of the second audio content to the third user and the fourth user, and, in step 1036, synchronously stream the third music content to the third user and the plurality of followers of the third user, the fourth user 1108 among the plurality of followers of the third user 1106. The process may end at step 1038.

Referring now to FIGS. 12-15, a flow chart and corresponding screenshots of exemplary embodiments of the present invention are illustrated, showing an implementation of a software application interface running on, for example, a mobile electronic device 604, a user computer 610, or the wireless plug-in repeater 100 (see FIG. 6).

Figure 12:
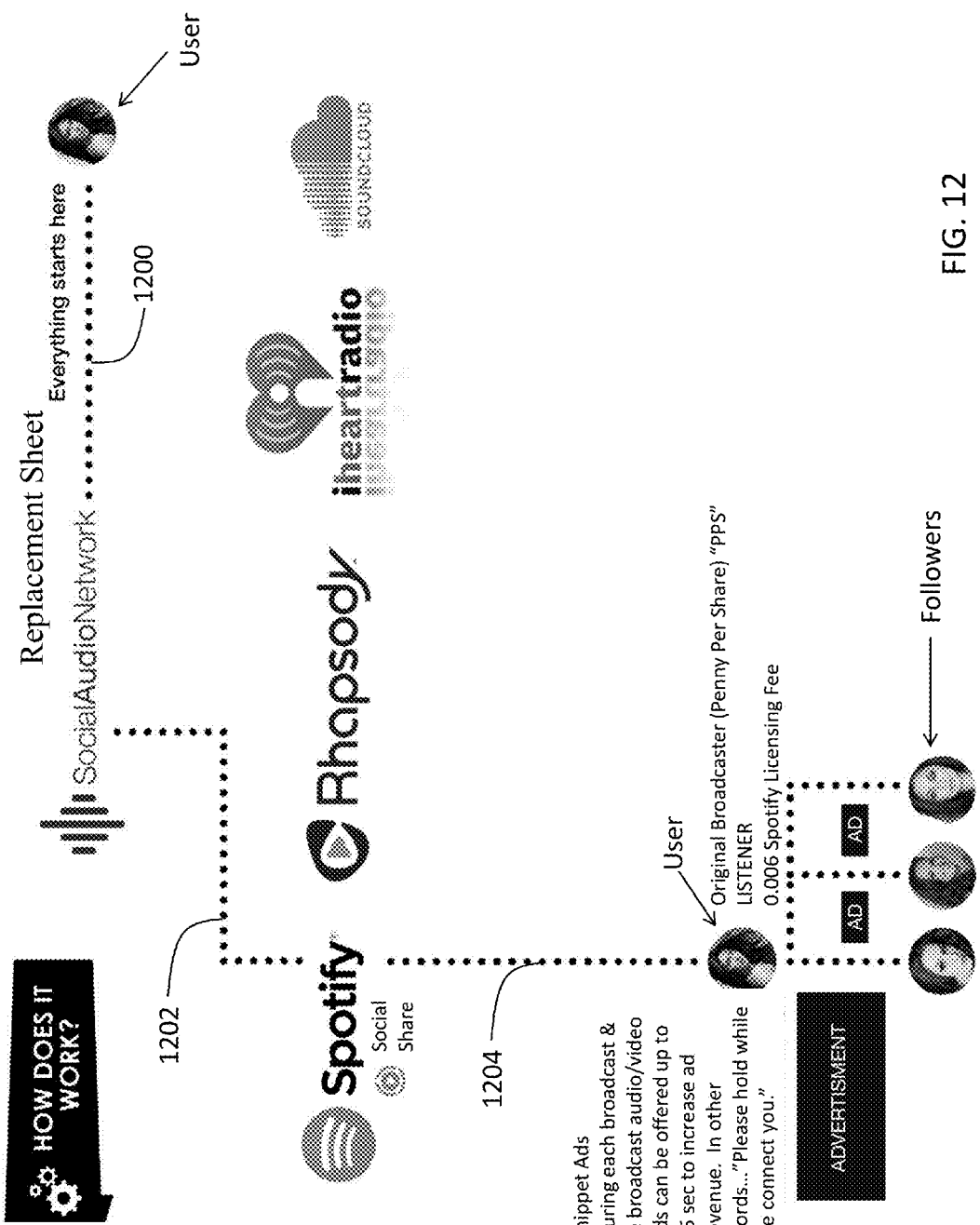
FIG. 12 is a process flow chart representing an exemplary method in accordance with an embodiment of the present invention.
Figure 13:
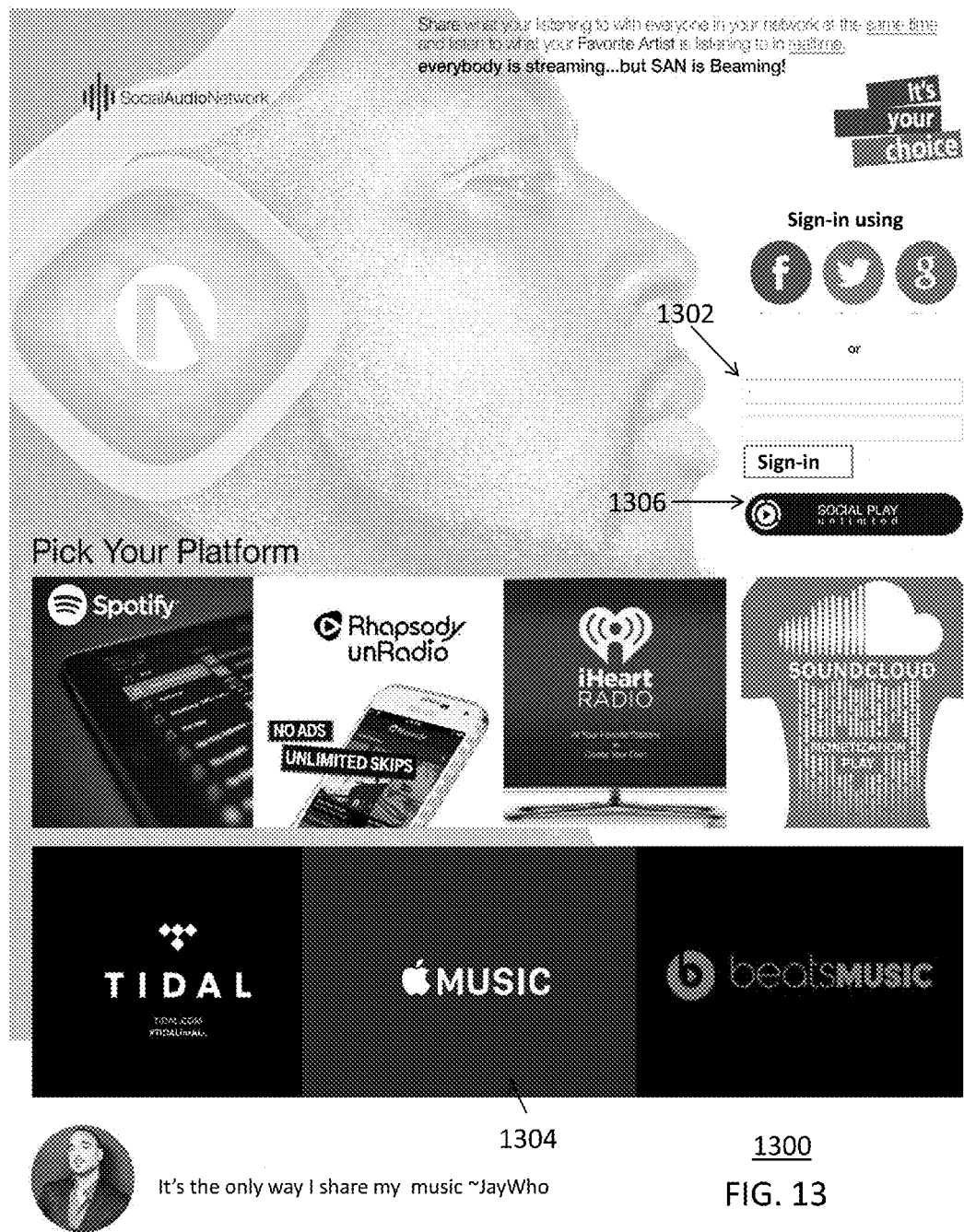
FIG. 13 is a screenshot of an exemplary log-in web page in accordance with an embodiment of the present invention.
Figure 14:
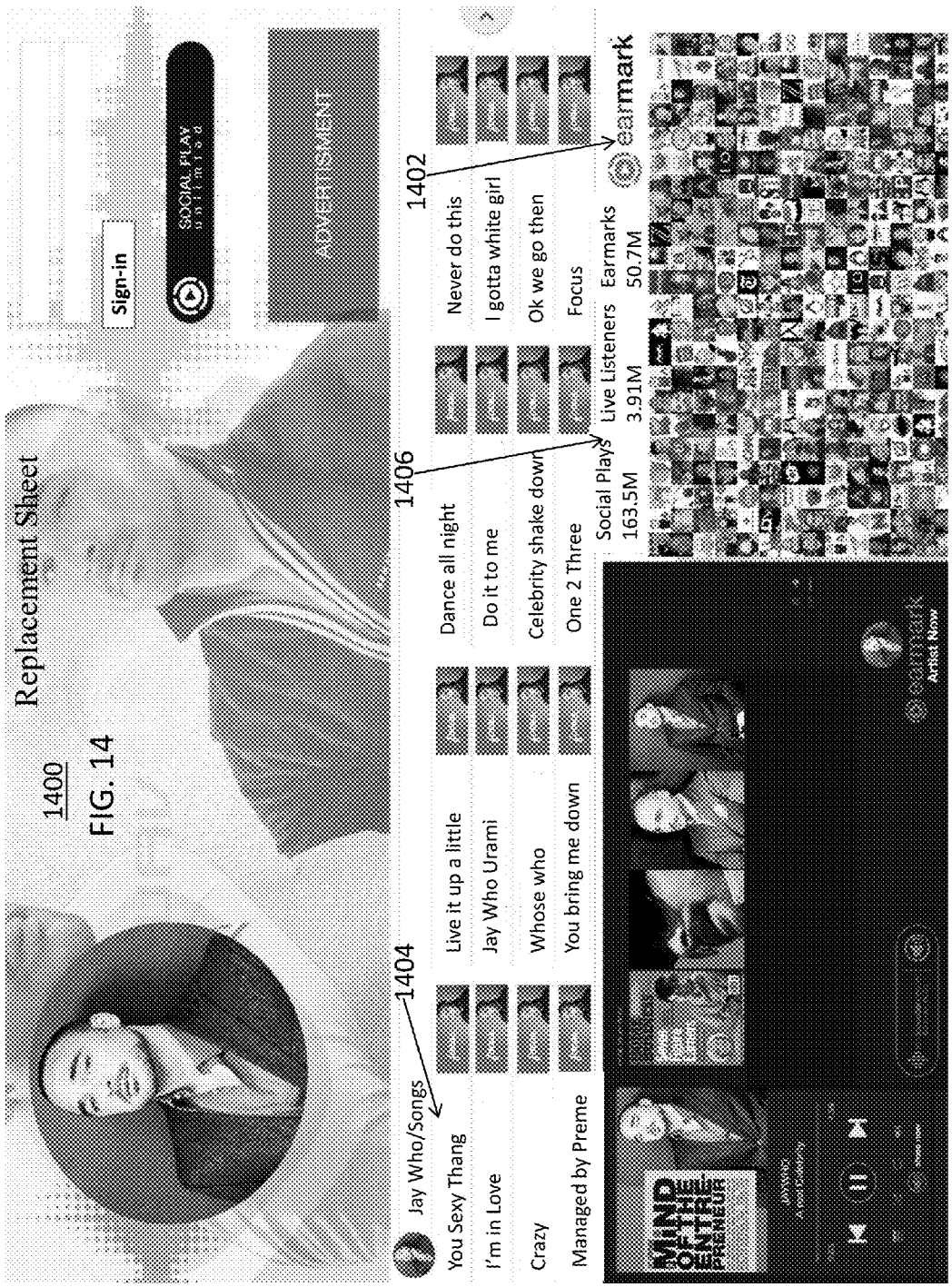
FIG. 14 is a screenshot of yet another exemplary log-in web page in accordance with an embodiment of the present invention.
Figure 15:
FIG. 15 is a screenshot of yet a further exemplary log-in web page in accordance with an embodiment of the present invention.

FIG. 12 is a flow chart of an exemplary process in accordance with the present invention. The process begins with step 1200, where a user logs-in to a user account with a unique username and password via a log-in user interface. The user may optionally create a new account if he or she does not already have one. In one embodiment, the user account may be associated with the music server. FIG. 13 illustrates one embodiment of a log-in user interface 1300. The interface may include user input fields 1302 for the user to input the unique username and password associated with the user's account. In step 1202, the user may log-in to the music server by selecting a music platform from a plurality of music platforms 1304 that are displayed to the user. For example, the user may select to log-in to the music server through the Spotify platform. In another embodiment, the user may log-in to the music server through his/her iHeart Radio account. In yet another embodiment, the user may log directly into the music server by selecting a button 1306 on the user interface 1300 that allows the user to directly log-in to his music server account, without logging in through a third-party platform. The music server of the present invention can be considered a social audio network. FIG. 14 illustrates yet another embodiment of a log-in user interface 1400 in accordance with the present invention. In one embodiment, the log-in user interface 1400 may include computer displayable content associated with a celebrity or artist. The user interface 1400 may also include a button 1402 or other computer displayable selector that the user may select to follow the celebrity in accordance with the present invention by automatically receiving an audio stream that is synchronous with the audio streamed to the celebrity user account. In one embodiment, an advertisement may be displayed to the user while the user's account is being configured and prepared for synchronous streaming with the celebrity user account. The advertisement may be a static image, an audio commercial, or may be a video commercial that is played during the connection process to the music server. In a further embodiment, the user interface 1400 may also include a list 1404 of songs that were recently streamed to or otherwise listened to by the celebrity. In yet a further embodiment, the user interface 1400 may also include statistics 1406 associated with the celebrity's music server account. For example, the statistics 1406 may show the number of "earmark" followers of the celebrity's music server account. The number of earmark followers shown in the statistics (e.g., 50.7M) may indicate the number of users that selected the button 1402 to synchronously follow, i.e., earmark, the celebrity. In a further embodiment, the statistics 1406 may also show the number of live listeners (e.g., 3.91M) that are currently receiving synchronous streaming of the audio content with the celebrity music server account. In yet a further embodiment, the statistics 1406 may show the number of social plays of the celebrity, which may be a calculation of the number of music content files (e.g., songs) that the celebrity has received through the music server synchronously with the celebrity's followers. By selecting the earmark button 1402, a user may become a synchronous follower of the celebrity's audio stream. Of course, in other embodiments users may earmark non-celebrity accounts that may be associated with, for example, friends and family. FIG. 15 illustrates yet another embodiment of a log-in user interface 1500 in accordance with the present invention.

In step 1204, after the user has logged-in, the user may begin listening to music content through the user's music server account. Accordingly, the music server may automatically copy the digital music content that the user is listening to and synchronously stream said digital content to the user's plurality of followers. In one embodiment, the user may be a celebrity or other well-known artist. In another embodiment, the user may be a non-celebrity or non-artist user. In one embodiment, the user may receive a royalty percentage from royalties received by the owner of copyrighted content for allowing the copyrighted digital content to be streamed to each follower. In the instant example, the owner of the copyrighted digital content may receive a royalty for allowing the content to be distributed to a user. In turn, the user may receive a percentage (e.g., 0.006) of that royalty for each of the user's followers that receives the streamed content synchronously. In an alternative embodiment, the user may receive a lump sum amount per number of social plays to each follower. The lump sum amount may be provided by the third-party platform, as an incentive for users to bring more followers to the third-party platform. In another embodiment, the lump sum amount may be paid by another entity, such as the owners and operators of the social audio network music server. In yet another embodiment, the user may receive a predetermined monetary amount for each follower that follows the user (e.g., $1). In a further embodiment, the user may receive a predetermined monetary amount for each follower that creates an account with the third-party platform in order to follow said user. The predetermined monetary amount may be a one-time payment in some embodiments. In yet another embodiment, the user may be required to possess a certain number of followers before being eligible for a compensation plan. In a further embodiment, the user may receive compensation from third-party advertisers that may desire to advertise through the user's account to the user's followers. There are many compensation models that may be utilized with the present invention. In yet a further embodiment, the user may receive no monetary compensation for synchronously streaming to followers. In this case, the user may simply enjoy sharing his musical tastes with others in a synchronous manner, including remote friends and family.

Although embodiments of the present invention are described with reference to a music server and music content, it is understood that some embodiments of the present invention may be implemented with other media types, such as television programming, video, video with audio, non-music audio, such as news programs, and the like.

A device, system, and method has been disclosed that that allows audio content from a single audio source, e.g., a cellular mobile device, a speaker, or a headset, to be simultaneously, synchronously communicated, over long distances, to a multitude of remote audio receiver devices, in a secure manner, while maintaining high sound quality. In addition, embodiments of the present invention provide a dynamic media distribution model where selection of content and control of synchronous streaming sessions may be controlled by end-users by virtue of being actively followed by other end-users.

What is claimed is:

1. A method for dynamic media distribution, the method comprising steps of:
   receiving, by an audio content server system, from a computing device of a first user, a request to follow a second user;
   designating, by the audio content server system, the first user as a follower of the second user as a result of the first user's request to follow the second user;
   receiving, by the audio content server system, from a computing device of a third user, a request to follow the first user;
   designating, by the audio content server system, the third user as a follower of the first user as a result of the third user's request to follow the first user;
   receiving, from a computing device of the second user, a request to stream a first audio content;
   identifying, by the audio content server system, a plurality of followers of the second user as a result of the second user's request to stream the first audio content, the first user among the plurality of followers of the second user;
   synchronously streaming, by the audio content server system, the first audio content to the second user and the plurality of followers of the second user as a result of the second user's request to stream the first audio content, the step of synchronously streaming the first audio content including streaming the first audio content to the first user and the third user;
   while performing the step of synchronously streaming the first audio content, receiving, by the audio content server system, a request from the computing device of the first user to stream a second audio content, different from the first audio content;
   identifying, by the audio content server system, a plurality of followers of the first user as a result of the first user's request to stream the second audio content, the third user among the plurality of followers of the first user; and
   independent of the synchronous streaming of the first audio content to the second user, the audio content server system ending the synchronous streaming of the first audio content to the first user and the third user and synchronously streaming the second audio content to the first user and the plurality of followers of the first user as a result of the first user's request to stream the second audio content.

2. The method in accordance with claim 1, wherein:
   the step of synchronously streaming the second audio content includes streaming the second audio content to the third user automatically, without receiving a request from the third user to stream the second audio content.

3. The method in accordance with claim 1, wherein the step of designating the first user comprises:
   configuring an account of the first user to automatically transmit, by the audio content server system, to the computing device of the first user, a real-time copy of an audio stream transmitted to the computing device of the second user such that the audio stream and the real-time copy are played substantially synchronously on the computing devices of the first and the second user, said computing devices communicatively coupled over the Internet.

4. The method in accordance with claim 1, wherein:
   the first user, the second user, and the third user each have a user account with the audio content server system, each user account associated with a username and a password that provides the corresponding user with access to the audio content server system.

5. The method in accordance with claim 1, further comprising steps of:

ending, by the audio content server system, the synchronous streaming of the second audio content to the first user; and as a result of the step of ending the synchronous streaming of the second audio content to the first user, automatically ending, by the audio content server system, the synchronous streaming of the second audio content to the third user as a result of the third user being a follower of the first user and without receiving a request from the third user to end said synchronous streaming.

6. The method in accordance with claim 1, further comprising a step of:

while performing the step of synchronously streaming the first audio content to the first user, the second user, and the third user, continuously monitoring, by the audio content server system, a latency period for the computing devices of the first user, the second user, and the third user and adjusting a streaming speed to each of the computing devices based on the latency period.

7. The method in accordance with claim 1, further comprising a step of:

while performing the step of synchronously streaming the first audio content to the first user, the second user, and the third user, repetitively calculating, by the audio content server system, a latency period for the computing devices of the first user, the second user, and the third user and adjusting a timing for transmitting data packets associated with the first audio content to each of the computing devices so that the first audio content is played on each of the computing devices synchronously to within less than about a 20 millisecond delay.

8. The method in accordance with claim 1, further comprising steps of:

receiving, by an audio content server system, from a computing device of a fourth user, a request to follow the third user;

designating, by the audio content server system, the fourth user as a follower of the third user as a result of the fourth user's request to follow the third user;

synchronously streaming, by the audio content server system, the second audio content to the fourth user as a result of designating the fourth user as a follower of the third user;

receiving, by the audio content server system, a request from a computing device of the third user to stream a third audio content, different from the first and second audio content;

identifying, by the audio content server system, a plurality of followers of the third user as a result of the third user's request to stream the third audio content, the fourth user among the plurality of followers of the third user; and independent of the synchronous streaming of the first audio content to the second user and the second audio content to the first user, the audio content server system ending the synchronous streaming of the second audio content to the third user and the fourth user and synchronously streaming the third audio content to the third user and the plurality of followers of the third user as a result of the third user's request to stream the third audio content.

9. A server system for dynamic media distribution, the server system comprising:

at least one network connection communicatively coupled to the Internet; and at least one processor communicatively coupled to the at least one network connection, the at least one processor operable to:

receive, over the at least one network connection, from a computing device of a first user, a request to follow a second user;

designate the first user as a follower of the second user as a result of the first user's request to follow the second user;

receive, over the at least one network connection, from a computing device of a third user, a request to follow the first user;

designate the third user as a follower of the first user as a result of the third user's request to follow the first user;

receive, over the at least one network connection, from a computing device of the second user, a request to stream a first audio content;

synchronously stream, over the at least one network connection, the first audio content to the second user and a plurality of followers of the second user, the first user among the plurality of followers of the second user and the synchronous streaming of the first audio content includes streaming the first audio content to the first user and the third user;

receive, over the at least one network connection, a request from the computing device of the first user to stream a second audio content, different from the first audio content; and independent of the synchronous streaming of the first audio content to the second user, end the synchronous streaming of the first audio content to the first user and the third user and synchronously stream, over the at least one network connection, the second audio content to the first user and a plurality of followers of the first user, the third user among the plurality of followers of the first user and the synchronous streaming of the second audio content includes streaming the second audio content to the third user.

10. The server system in accordance with claim 9, wherein the at least one processor is further operable to:

synchronously stream the second audio content by synchronously streaming the second audio content to the third user automatically, without receiving a request from the third user to stream the second audio content.

11. The server system in accordance with claim 9, wherein the at least one processor is further operable to:

designate the first user as a follower of the second user by configuring an account of the first user to automatically transmit to the computing device of the first user, a real-time copy of an audio stream transmitted to the computing device of the second user such that the audio stream and the real-time copy are played substantially synchronously on the computing devices of the first and the second user, said computing devices communicatively coupled over the Internet.

12. The server system in accordance with claim 9, wherein:

the first user, the second user, and the third user each have a user account with server system, each user account associated with a username and a password that provides the corresponding user with access to the server system.

13. The server system in accordance with claim 9, wherein the at least one processor is further operable to:
    end the synchronous streaming of the second audio content to the first user; and
    as a result of ending the synchronous streaming of the second audio content to the first user, automatically end the synchronous streaming of the second audio content to the third user as a result of the third user being a follower of the first user and without receiving a request from the third user to end said synchronous streaming.

14. The server system in accordance with claim 9, wherein the at least one processor is further operable to:
    while synchronously streaming the first audio content to the first user, the second user, and the third user, constantly monitor a latency period for the computing devices of the first user, the second user, and the third user and adjust a streaming speed to each of the computing devices based on the latency period.

15. The server system in accordance with claim 9, wherein the at least one processor is further operable to:
    while synchronously streaming the first audio content to the first user, the second user, and the third user, repetitively calculate a latency period for the computing devices of the first user, the second user, and the third user and adjusting a timing for transmitting data packets associated with the first audio content to each of the computing devices so that the first audio content is played on each of the computing devices synchronously to within less than about a 20 millisecond delay.

16. The server system in accordance with claim 9, wherein the at least one processor is further operable to:
    receive from a computing device of a fourth user, a request to follow the third user;
    designate the fourth user as a follower of the third user as a result of the fourth user's request to follow the third user;
    synchronously stream the second audio content to the fourth user as a result of designating the fourth user as a follower of the third user;
    receive, from a computing device of the third user, a request to stream a third audio content, different from the first and second audio content;
    identify a plurality of followers of the third user as a result of the third user's request to stream the third audio content, the fourth user among the plurality of followers of the third user; and
    independent of the synchronous streaming of the first audio content to the second user and the second audio content to the first user, end the synchronous streaming of the second audio content to the third user and the fourth user and synchronously stream the third audio content to the third user and the plurality of followers of the third user as a result of identifying the plurality of followers of the third user.

17. A method of receiving and controlling synchronous communications, the method comprising steps of:
    sending, by a first computing device, to an audio content server system, a request to follow a first user of the audio content server system;
    receiving, by the first computing device, from an audio content server system, a stream of a first audio content that is also synchronously streamed, by the audio content server system, to the first user as a result of the audio content server system designating a user associated with the first computing device as a follower of the first user and the audio content server system receiving a request from the first user to synchronously stream the first audio content to the first user and a plurality of followers of the first user;
    while performing the step of receiving the synchronous stream of the first audio content, sending, by the first computing device, to the audio content server, a request to stream a second audio content, different from the first audio content; and
    as a result of the request to stream the second audio content, receiving, by the first computing device, from the audio content server, a stream of the second audio content that is also synchronously streamed, by the audio content server, to remote computing devices of a plurality of followers of the user associated with the first computing device.

18. The method in accordance with claim 17, further comprising:
    sending, to the audio content server system, a time-stamped packet that also includes an estimate of the total-time-on-device (TOD) for the first computing device.

19. The method in accordance with claim 17, wherein:
    the first computing device plays the second audio content substantially synchronously with playback of the second audio content on the remote computing devices of the plurality of followers to within less than about a 20 millisecond delay between each of the remote computing devices.

20. The method in accordance with claim 17, further comprising:
    sending, by the first computing device, to the audio content server system, a request to follow a second user of the audio content server system, the second user different from the first user; and
    as a result of the request to follow the second user, receiving, by the first computing device, from the audio content server, an audio stream that is identical to and substantially synchronous with an audio stream transmitted to computing devices of the second user and a plurality of followers of the second user.

* * * * *